United States Patent
Ohnishi

(10) Patent No.: US 10,122,910 B2
(45) Date of Patent: Nov. 6, 2018

(54) FOCUS DETECTION DEVICE AND IMAGE-CAPTURING APPARATUS

(71) Applicant: NIKON CORPORATION, Tokyo (JP)

(72) Inventor: Naoyuki Ohnishi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/039,175

(22) PCT Filed: Nov. 26, 2014

(86) PCT No.: PCT/JP2014/081276
§ 371 (c)(1),
(2) Date: Dec. 19, 2016

(87) PCT Pub. No.: WO2015/080164
PCT Pub. Date: Jun. 4, 2015

(65) Prior Publication Data
US 2017/0118396 A1      Apr. 27, 2017

(30) Foreign Application Priority Data

Nov. 26, 2013   (JP) .................................. 2013-243944

(51) Int. Cl.
  *H04N 5/232* (2006.01)
  *H04N 5/225* (2006.01)
  (Continued)

(52) U.S. Cl.
  CPC .......... *H04N 5/23212* (2013.01); *G02B 7/34* (2013.01); *G02B 7/365* (2013.01); *H04N 5/2254* (2013.01); *H04N 5/2353* (2013.01)

(58) Field of Classification Search
  CPC ............. H04N 5/23212; H04N 5/2254; H04N 5/2353; G02B 7/365; G02B 7/34
  (Continued)

(56) References Cited

U.S. PATENT DOCUMENTS 5,068,682 A   11/1991   Utagawa
5,138,357 A    8/1992   Utagawa
(Continued)

FOREIGN PATENT DOCUMENTS

JP    S59-123808 A    7/1984
JP    S61-018912 A    1/1986
(Continued)

OTHER PUBLICATIONS

Mar. 3, 2015 International Search Report issued in International Patent Application No. PCT/JP2014/081276.
(Continued)

*Primary Examiner* — Pritham Prabhakher
(74) *Attorney, Agent, or Firm* — Oliff PLC

(57) ABSTRACT

A focus detection device includes: a sensor outputting a pair of focus detection signal sequences, each of which being made of a plurality of focus detection signals; a difference calculation unit obtaining a plurality of differences by sequentially calculating differences between focus detection signals corresponding to each other in the pair of focus detection signal sequences; a division unit dividing the pair of focus detection signal sequences into at least two pairs of partial signal sequences based on the plurality of differences; a focus detection parameter calculation unit calculating a first focus detection parameter according to a phase difference amount of a first pair of partial signal sequences and a second focus detection parameter in accordance with a phase difference amount of a second pair of partial signal sequences; and a focus adjustment parameter determination unit determining either the first or second focus detection parameters, as a focus adjustment parameter.

5 Claims, 22 Drawing Sheets

(51) Int. Cl.
  *H04N 5/235* (2006.01)
  *G02B 7/36* (2006.01)
  *G02B 7/34* (2006.01)

(58) Field of Classification Search
  USPC .......................................................... 348/350
  See application file for complete search history.

(56) References Cited

U.S. PATENT DOCUMENTS

| | | | |
|---|---|---|---|
| 5,389,995 A | 2/1995 | Uchiyama | |
| 7,873,267 B2* | 1/2011 | Kusaka | G02B 7/36 348/345 |
| 8,305,483 B2* | 11/2012 | Fujii | H04N 5/23212 348/345 |
| 8,571,402 B2* | 10/2013 | Takeuchi | G03B 13/36 348/169 |
| 8,730,373 B2* | 5/2014 | Egawa | G02B 7/34 348/175 |
| 9,001,262 B2* | 4/2015 | Onuki | H04N 5/23212 348/352 |
| 9,065,999 B2* | 6/2015 | Tay | H04N 5/23212 |
| 9,456,141 B2* | 9/2016 | Fishman | H04N 5/23293 |
| 9,625,675 B2* | 4/2017 | Fukuda | G02B 7/34 |
| 2010/0302433 A1* | 12/2010 | Egawa | G02B 7/34 348/345 |
| 2011/0019989 A1* | 1/2011 | Tanaka | H04N 5/23212 396/104 |
| 2013/0314500 A1* | 11/2013 | Aoki | H04N 13/021 348/46 |
| 2014/0104484 A1* | 4/2014 | Karasawa | H04N 5/23212 348/350 |
| 2014/0118610 A1* | 5/2014 | Ohara | H04N 5/23212 348/349 |

FOREIGN PATENT DOCUMENTS

| | | |
|---|---|---|
| JP | S61-55620 A | 3/1986 |
| JP | H06-82686 A | 3/1994 |
| JP | H08-015603 A | 1/1996 |
| JP | H10-26526 A | 1/1998 |
| JP | 2013-037166 A | 2/2013 |

OTHER PUBLICATIONS

May 31, 2016 International Preliminary Report on Patentability issued in International Patent Application No. PCT/JP2014/081276.

Nov. 21, 2017 Office Action issued in Japanese Patent Application No. 2013-243944.

Aug. 21, 2018 Office Action issued in Japanese Patent Application No. 2013-243944.

* cited by examiner

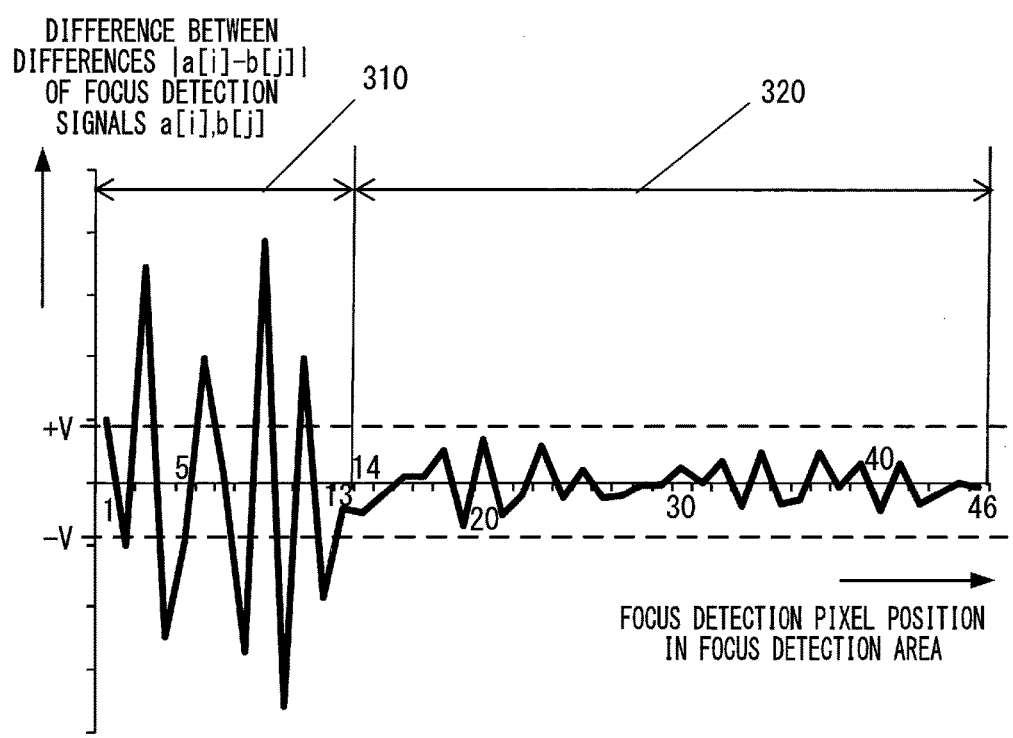

FOCUS DETECTION DEVICE AND IMAGE-CAPTURING APPARATUS

TECHNICAL FIELD

The present invention relates to a focus detection device and an image-capturing apparatus.

BACKGROUND ART

In cameras employing a phase detection method for a focus detection, there is an art that detects a defocus amount of an optional subject among distant subjects and near subjects by previously dividing a focus detection signal sequence used for a calculation in a range sensor, if the distant subjects and the near subjects are present in the same photographic screen, for example.

CITATION LIST

Patent Literature

PTL1: Japanese Laid-Open Patent Publication No. H06-82686

SUMMARY OF INVENTION

Technical Problem

According to PTL1, the focus detection pixel row is divided in a plurality of blocks. However, a focus detection error may occur because boundaries between the blocks do not always correspond to boundaries between distant subjects and near subjects present in the same photographic screen.

Solution to Problem

According to the first aspect of the present invention, a focus detection device comprises: a focus detection sensor receiving a pair of light fluxes that has passed through a pair of pupil regions of an optical system and outputting a pair of focus detection signal sequences, each focus detection signal sequence being made of a plurality of focus detection signals; a difference calculation unit obtaining a plurality of differences by sequentially calculating differences between focus detection signals corresponding to each other in the pair of focus detection signal sequences; a division unit dividing the pair of focus detection signal sequences into at least two pairs of partial signal sequences, the at least two pairs of partial signal sequences including a first pair of partial signal sequences and a second pair of partial signal sequences, based on the plurality of differences obtained by the difference calculation unit; a focus detection parameter calculation unit calculating a first focus detection parameter in accordance with a phase difference amount of the first pair of partial signal sequences and a second focus detection parameter in accordance with a phase difference amount of the second pair of partial signal sequences; and a focus adjustment parameter determination unit determining either the first focus detection parameter or the second focus detection parameter, as a focus adjustment parameter used for a focus adjustment.

According to the second aspect of the present invention, in the focus detection device according to the first aspect, it is preferred that the focus detection parameter calculation unit calculates a minimum value of a correlation amount of the pair of focus detection signal sequences while shifting the pair of focus detection signal sequences relative to each other by a predetermined shift amount, and then calculates another focus detection parameter based on a specific shift amount of the pair of the focus detection signal sequences, the specific shift amount providing the minimum value; and the difference calculation unit obtains the plurality of differences in the pair of focus detection signal sequences in a state where the pair of focus detection signal sequences has been shifted relative to each other by the specific shift amount.

According to the third aspect of the present invention, in the focus detection device according to the second aspect, it is preferred that, if the minimum value is equal to or higher than a predetermined value, the focus adjustment parameter determination unit determines either the first focus detection parameter or the second focus detection parameter as the focus adjustment parameter; and, if the minimum value is lower than the predetermined value, the focus adjustment parameter determination unit determines the another focus detection parameter as the focus adjustment parameter.

According to the fourth aspect of the present invention, in the focus detection device according to the second aspect or the third aspect, it is preferred that the focus adjustment parameter determination unit determines either the first focus detection parameter or the second focus detection parameter as the focus adjustment parameter, if brightness of a subject image formed by the optical system is not lower than a predetermined brightness; and the focus adjustment parameter determination unit determines the another focus detection parameter as the focus adjustment parameter, if the brightness of the subject image is lower than the predetermined brightness.

According to the fifth aspect of the present invention, in the focus detection device according to any one of the first to fourth aspects, it is preferred that the division unit divides the pair of focus detection signal sequences into the first pair of partial signal sequences and the second pair of partial signal sequences, depending on whether or not each of the plurality of differences obtained by the difference calculation unit is equal to or higher than an average value of the plurality of differences.

According to the sixth aspect of the present invention, in the focus detection device according to any one of the first to fourth aspects, it is preferred that the division unit divides the pair of focus detection signal sequences into the first pair of partial signal sequences and the second pair of partial signal sequences, depending on whether or not a magnitude of a difference between adjacent differences in the plurality of differences obtained by the difference calculation unit is smaller than a predetermined value.

According to the seventh aspect of the present invention, in the focus detection device according to any one of the first to sixth aspects, it is preferred that the division unit divides the pair of focus detection signal sequences into the first pair of partial signal sequences, the second pair of partial signal sequences, and a third pair of partial signal sequences, based on the plurality of differences obtained by the difference calculation unit; if the pair of focus detection signal sequences is divided by the division unit into the first pair of partial signal sequences, the second pair of partial signal sequences, and the third pair of partial signal sequences, the focus detection parameter calculation unit calculates a third focus detection parameter in accordance with a phase difference amount of the third pair of partial signal sequences, in case calculating the first focus detection parameter and the second focus detection parameter; and the focus adjustment parameter determination unit determines one of the first focus detection parameter, the second focus detection parameter, and the third focus detection parameter as the focus adjustment parameter.

According to the eighth aspect of the present invention, in the focus detection device according to any one of the first to seventh aspects, it is preferred that the focus detection parameter calculation unit calculates a first defocus amount and a second defocus amount respectively as the first focus detection parameter and the second focus detection parameter; and the focus adjustment parameter determination unit determines a nearer-side defocus amount of the first defocus amount and the second defocus amount, as the focus adjustment parameter.

According to the ninth aspect of the present invention, in the focus detection device according to any one of the first to eighth aspects, it is preferred that the focus detection device further comprises: an image sensor receiving light fluxes that have passed through the optical system, via a microlens array, and outputting image-capturing signals. The focus detection sensor is provided independently of the image sensor or included in the image sensor; and, if the focus detection sensor is provided independently of the image sensor, the pair of light fluxes are received by the focus detection sensor after passing through the pair of pupil regions and then passing through a microlens array or an image reforming optical system.

According to the tenth aspect of the present invention, an image-capturing apparatus comprises: the focus detection device according to the ninth aspect; the optical system; a focus adjustment unit performing the focus adjustment based on the focus adjustment parameter determined by the focus adjustment parameter determination unit; and an image generation unit generating an image based on the image-capturing signals output by the image sensor in case that the optical system focuses on the light receiving surface of the image sensor by the focus adjustment.

Advantageous Effects of Invention

According to the present invention, when a scene including both distant subjects and near subjects is to be focused, a focus adjustment can be performed after properly dividing a focus detection signal sequence depending on distances of the subjects from the present apparatus, under the consideration of the circumstance of the subjects.

BRIEF DESCRIPTION OF DRAWINGS

FIG. 22 is a graph illustrating differences between absolute values $|a[i]-b[j]|$ of differences illustrated in FIG. 9.

DESCRIPTION OF EMBODIMENTS

Figure 1:
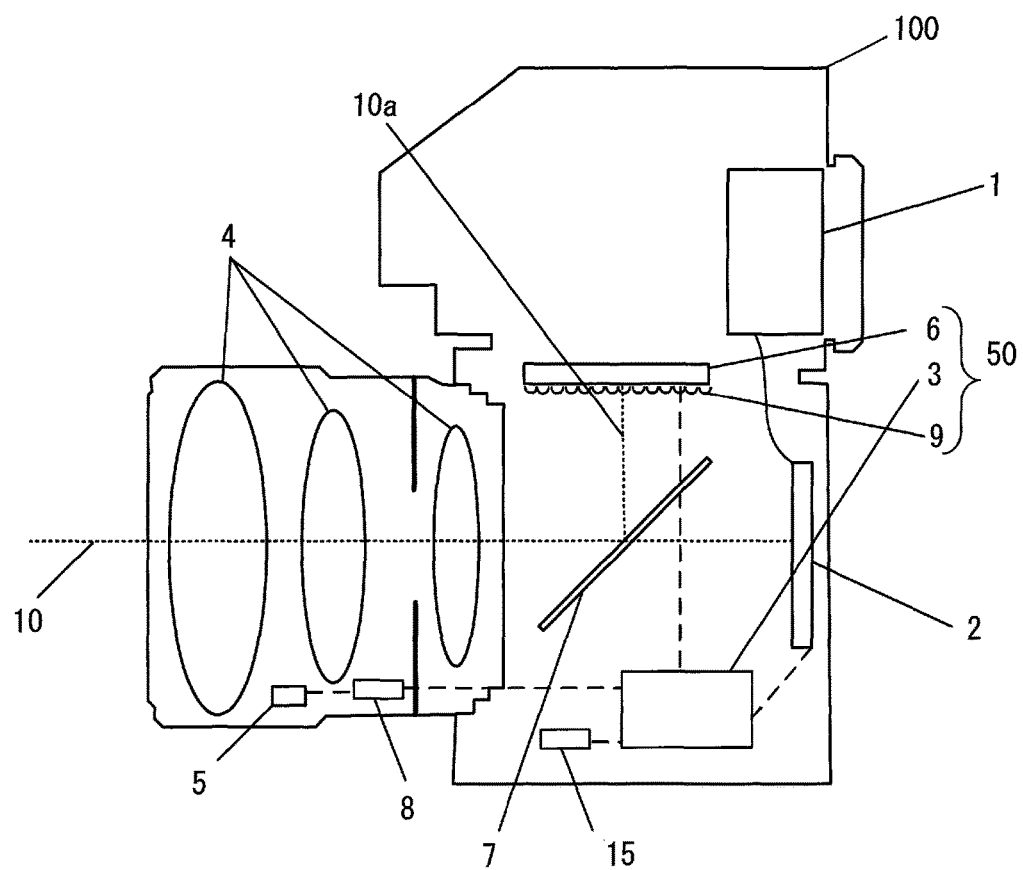
FIG. 1 is a view illustrating a configuration of an image-capturing apparatus having a focus detection device in one embodiment of the present invention.

A focus detection device and an image-capturing apparatus including such a focus detection device according to one embodiment of the present invention will be described with reference to the drawings. FIG. 1 is a view illustrating a configuration of an image-capturing apparatus 100 including a focus detection device 50 according to this embodiment. The image-capturing apparatus 100 includes the focus detection device 50, a liquid crystal display element 1, an image sensor 2, a photographing optical system 4, a lens drive motor 5, a half mirror 7, a focus adjustment device 8, and a storage device 15. The focus detection device 50 includes a focus detection sensor 6, a microlens array 9, and a controller 3.

The photographing optical system 4 is an optical system for forming subject images on a focal plane. The photographing optical system 4 includes a plurality of lenses and diaphragms. Among the plurality of lenses, a focus adjustment lens can be moved by the lens drive motor 5 in a direction of an optical axis 10 of the photographing optical system 4.

The half mirror 7 is a thin mirror, such as a pellicle mirror, and is located in an optical path along the optical axis 10 as illustrated in FIG. 1. Incident light fluxes pass through the photographing optical system 4 and then some of the incident light fluxes are reflected from the half mirror 7 in a direction of an optical axis 10a, i.e., toward the microlens array 9, while the rest of the incident light fluxes, which are not reflected, transmit through the half mirror 7. The light fluxes that have been reflected from the half mirror 7, referred to as reflected light fluxes, transmit through the microlens array 9 made of a plurality of microlenses arranged in two dimensions and the light fluxes are then incident on the focus detection sensor 6. The light fluxes that have transmitted through the half mirror 7, referred to as transmitted light fluxes, are incident on the image sensor 2. The microlens array 9 is arranged on the image-forming plane of the photographing optical system 4. The position of the microlens array 9 is equivalent to the position of an image-capturing plane of the image sensor 2.

The focus detection sensor 6 has a plurality of focus detection pixels arranged therein, the focus detection pixels generating electrical focus detection signals in accordance with the light fluxes received by the pixels. Among the plurality of focus detection pixels, a pair of focus detection pixel groups made of a part of focus detection pixels in a focus detection area receives a pair of light fluxes among the light fluxes incident on the focus detection sensor 6 through the microlens array 9 and performs an photoelectric conversion process, so that a pair of electrical focus detection signal sequences corresponding to the subject image is generated. Details thereof will be described later with reference to FIG. 3. The focus detection area may be displayed on a screen in such a manner that the focus detection area is superimposed on a through image, when the liquid crystal display element 1 displays the through image on the screen. The through image is based on a plurality of image-capturing signals, described later, output by the image sensor 2. A plurality of focus detection areas may be displayed on the screen of the liquid crystal display element 1 so that an user can specify one of the plurality of focus detection areas displayed on the screen while viewing the screen of the liquid crystal display element 1.

In generating the pair of focus detection signal sequences as described above, the controller 3 performs an exposure control of the plurality of focus detection pixels, a read-out control of the plurality of focus detection signals, and/or an amplification control of the plurality of focus detection signals that has been read out, for example, as an photoelectric conversion control of the focus detection sensor 6. The pair of focus detection signal sequences generated by the focus detection sensor 6 is output to the controller 3.

The controller 3 detects a focus of the photographing optical system 4 by the use of the split-pupil phase detection method, on the basis of the pair of focus detection signal sequences output by the focus detection sensor 6. The controller 3 detects a phase difference amount of the pair of focus detection signal sequences, as a focus detection parameter that is obtained from the focus detection. Alternatively, the controller 3 calculates a defocus amount as a focus detection parameter in accordance with the phase difference amount. The controller 3 determines a focus adjustment parameter on the basis of the phase difference amount or the defocus amount and then calculates, on the basis of the determined focus adjustment parameter, a lens drive amount for the focus adjustment lens of the photographing optical system 4 to send the lens drive amount to the focus adjustment device 8. After receiving the lens drive amount, the focus adjustment device 8 drives the focus adjustment lens of the photographing optical system 4 by the lens drive amount, via the lens drive motor 5. Details of the focus detection process performed by the controller 3 will be described later with reference to FIGS. 4 and 6.

In a photographing process, the half mirror 7 is swung up to cover the focus detection sensor 6 and is thus brought out of the optical path. As a result, all of the incident light fluxes that have passed through the photographing optical system 4 is incident on the image sensor 2 to form the subject image on a light receiving surface of the image sensor 2. The image sensor 2 has a plurality of image-capturing pixels arranged in two dimensions and the plurality of image-capturing pixels receives the incident light fluxes and performs the photoelectric conversion to generate the plurality of electrical image-capturing signals corresponding to the subject image formed by the photographing optical system 4. The plurality of image-capturing signals generated here is output by the image sensor 2.

The controller 3 generates an image on the basis of the plurality of image-capturing signals output by the image sensor 2 and then causes the liquid crystal display element 1 to display the generated image as the through image. The controller 3 also records the generated image in the storage device 15 when executing the image-capturing process in response to an image-capturing command from the user. Details of the image-capturing process performed by the controller 3 will be described later with reference to FIG. 12.

Figure 2:
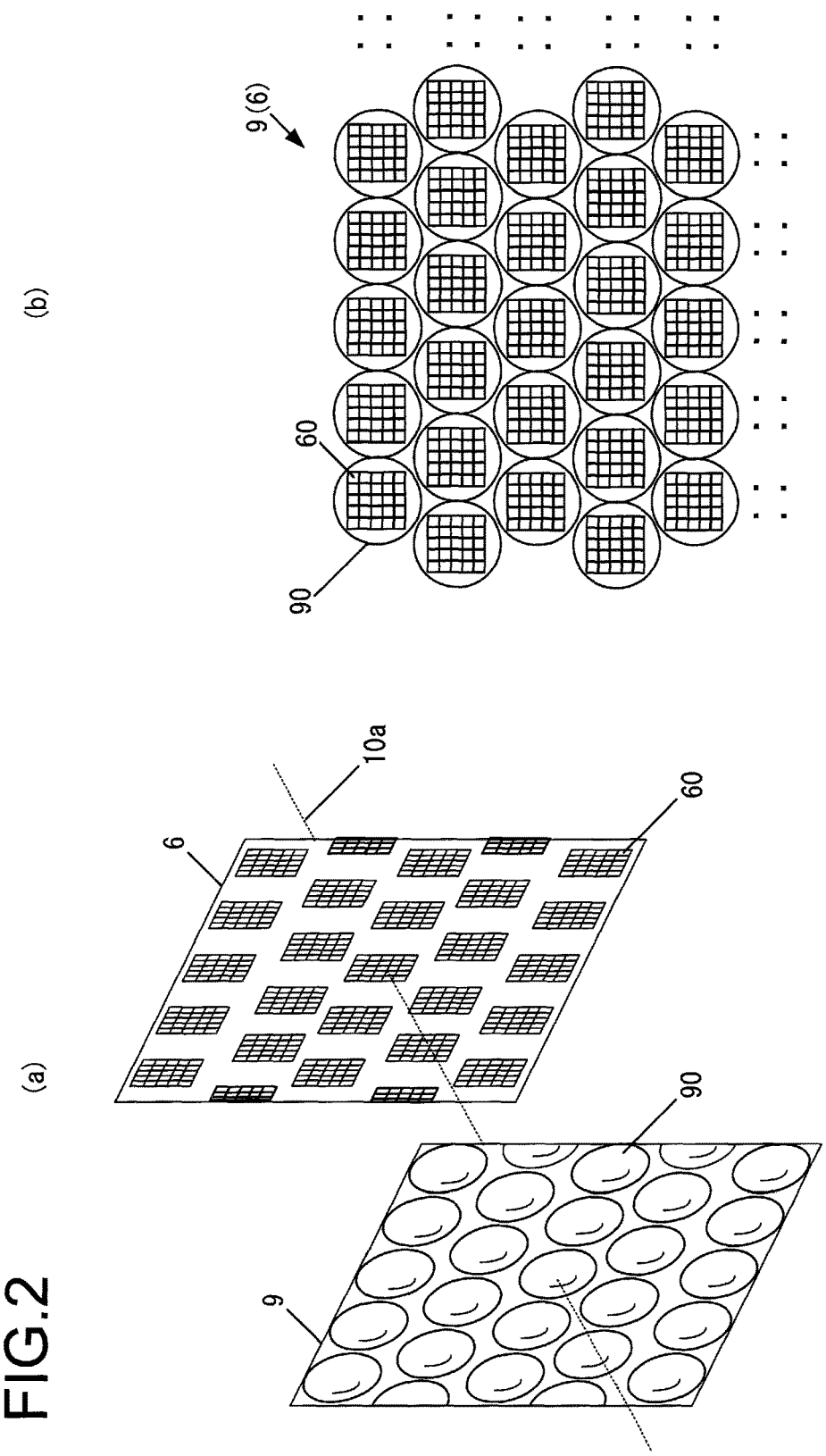
FIG. 2 is a view illustrating a focus detection sensor and a microlens array which covers the focus detection sensor.

FIG. 2 is a view illustrating the focus detection sensor 6 and the microlens array 9 which covers the focus detection sensor 6. FIG. 2(a) illustrates an enlarged view of the focus detection sensor 6 and the microlens array 9 in the vicinity of the optical axis 10a illustrated in FIG. 1. The focus detection sensor 6 has the plurality of focus detection pixels 60 arranged in two dimensions. The microlens array 9 has the plurality of microlenses 90 arranged in two dimensions (in a honeycomb-like array) with a pitch of 100 μm or less. Although a shape of the microlens 90 illustrated in the figure is a sphere, the shape may be a hexagon, which matches the honeycomb-like array.

FIG. 2(b) is a view as seen from directly above the microlens array 9, wherein the microlens array 9 and the focus detection sensor 6 located behind the microlens array 9 are illustrated overlapping each other. In the example in FIG. 2(b), a plurality of focus detection pixels 60, which are here 5 vertical by 5 horizontal pixels, corresponds to each microlens 90. A part of the incident light fluxes having passed through the photographing optical system 4 illustrated in FIG. 1 is reflected from the half mirror 7 as the reflected light fluxes, and then the reflected light fluxes arrive at and transmit through the microlens array 9 and are incident on the focus detection sensor 6. As described later with reference to FIG. 3, the light flux having transmitted through each microlens 90 is received by the plurality of focus detection pixels 60 corresponding to each microlens 90, which is here a total of 25 pixels constituted with 5 vertical by 5 horizontal pixels, so that the light flux is converted into the electrical focus detection signal by means of the photoelectric conversion. The plurality of focus detection pixels 60 corresponding to each microlens 90 is not limited to the total of 25 pixels constituted with 5 vertical by 5 horizontal pixels.

Figure 3:
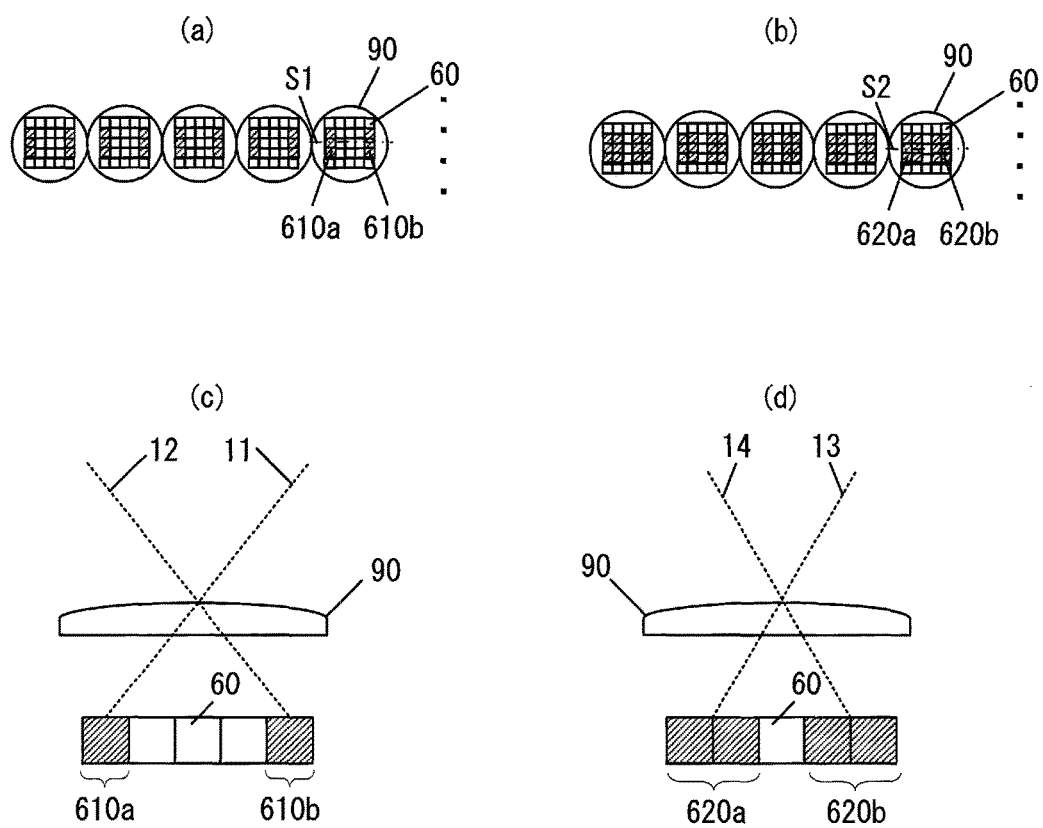
FIG. 3 is a view illustrating a relationship between a plurality of focus detection pixels and a microlens.

FIG. 3 is a view illustrating a relationship between the plurality of focus detection pixels 60 and microlenses 90.

FIGS. 3(a) and 3(b) are plan views of the plurality of focus detection pixels 60 and microlenses 90. In the examples illustrated in FIGS. 3(a) and 3(b), the plurality of focus detection pixels 60 corresponding to each microlens 90 is the total of 25 pixels constituted with 5 vertical by 5 horizontal pixels. Among the 25 focus detection pixels 60, a pair of focus detection pixel groups described above is specified. For the total of 25 focus detection pixels 60 constituted with 5 vertical by 5 horizontal focus detection pixels corresponding to each microlens 90 exemplified in FIG. 3(a), three center focus detection pixels are illustrated with hatching among five focus detection pixels included in each of two vertical columns of focus detection pixels located on both ends in a horizontal direction. The pixels with hatching form a pair of focus detection pixel groups 610a and 610b.

For the total of 25 focus detection pixels 60 constituted with 5 vertical by 5 horizontal focus detection pixels corresponding to each microlens 90 exemplified in FIG. 3(b), three center focus detection pixels are illustrated with hatching among five focus detection pixels included in each of a vertical column of focus detection pixels located on the left end in the figure in the horizontal direction and an adjacent vertical column of focus detection pixels. The pixels with hatching form one focus detection pixel group 620a of a pair of focus detection pixel groups 620a and 620b. Three center focus detection pixels are illustrated with hatching among five focus detection pixels included in each of a vertical column of focus detection pixels located on the right end in the figure in the horizontal direction and an adjacent vertical column of focus detection pixels. The pixels with hatching form the other focus detection pixel group 620b of the pair of focus detection pixel groups 620a and 620b. As illustrated in FIG. 3(b), each of the pair of focus detection pixel groups 620a and 620b includes a total of six focus detection pixels: two columns adjacently arranged in the horizontal direction, each column including three focus detection pixels arranged in the vertical direction.

FIGS. 3(c) and 3(d) respectively are cross-sectional views taken along dashed-dotted lines S1 and S2 of FIGS. 3(a) and 3(b) illustrating the plan views of sets of the total of 25 focus detection pixels 60 constituted with 5 vertical by 5 horizontal focus detection pixels and the microlens 90, wherein each dashed-dotted line S1, S2 extends in the horizontal direction through the focus detection pixel that is located in the center of the 25 focus detection pixels 60. In FIG. 3(c), the pair of focus detection pixel groups 610a and 610b receives a pair of light fluxes 11 and 12 having passed through a pair of pupil regions of the photographing optical system 4 and through the microlens 90, and generates the pair of electrical focus detection signals by means of the photoelectric conversion. FIG. 3(a) illustrates five sets of the 25 focus detection pixels 60 and the microlens 90. Thus, a focus detection signal sequence including five focus detection signals generated by five focus detection pixel groups 610a and a focus detection signal sequence including five focus detection signals generated by five focus detection pixel groups 610b are obtained. The two focus detection signal sequences form a pair of focus detection signal sequences. In the same manner, in FIG. 3(d), the pair of focus detection pixel groups 620a and 620b receives a pair of light fluxes 13 and 14 having passed through the pair of pupil regions of the photographing optical system 4 and through the microlens 90, and generates the pair of electrical focus detection signals by means of the photoelectric conversion. FIG. 3(b) illustrates five sets of the 25 focus detection pixels 60 and the microlens 90. Thus, five focus detection signal sequences generated by five focus detection pixel groups 620a and five focus detection signal sequences generated by five focus detection pixel groups 620b are obtained. The two focus detection signal sequences form a pair of focus detection signal sequences.

The focus adjustment of the photographing optical system 4 can be performed on the basis of a phase difference between the pair of focus detection signal sequences obtained in this way, or on the basis of a defocus amount calculated from the phase difference. It should be noted that a distance between the pair of focus detection pixel groups 610a and 610b illustrated in FIG. 3(c) is larger than a distance between the pair of focus detection pixel groups 620a and 620b illustrated in FIG. 3(d). Therefore, an aperture angle formed by the pair of light fluxes 11 and 12 illustrated in FIG. 3(c) is larger than an aperture angle formed by the pair of light fluxes 13 and 14 illustrated in FIG. 3(d). Although the present invention can be applied to both cases, it is preferable to apply the present invention to a case where a configuration having a large aperture angle as illustrated in FIG. 3(c) may be employed. This is because it is easier to detect a difference between changes in focus detection signal values caused by a scene including distant-subject images and near-subject images as described later, as the aperture angle increases.

Figure 4:
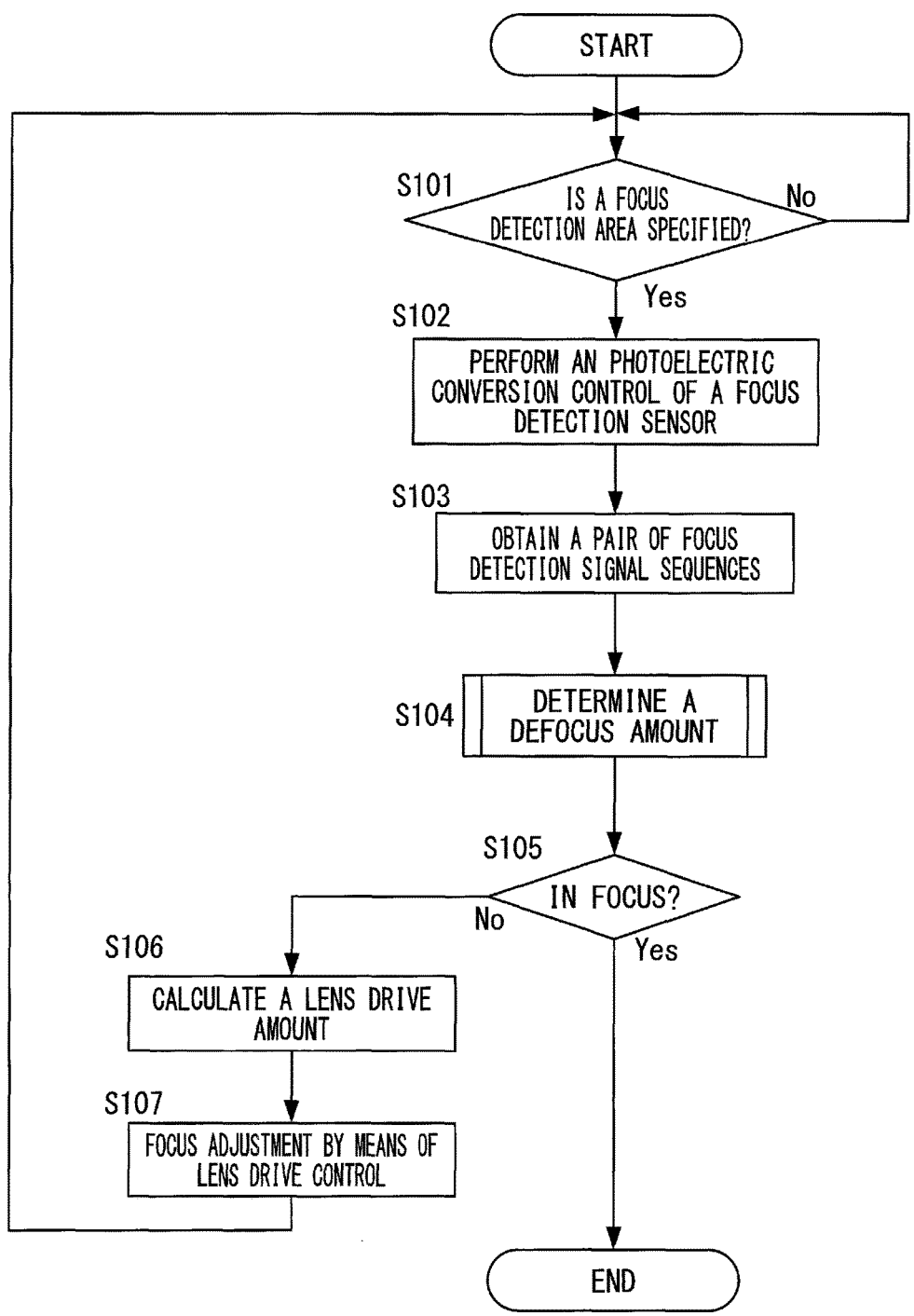
FIG. 4 is a flowchart of a focus detection process performed by a controller.

FIG. 4 is a flowchart of the focus detection process performed by the controller 3. The controller 3 is a computer including a CPU and a memory, for example. The CPU executes a computer program stored in the memory to perform process steps constituting the focus detection process illustrated in FIG. 4.

Figure 5:
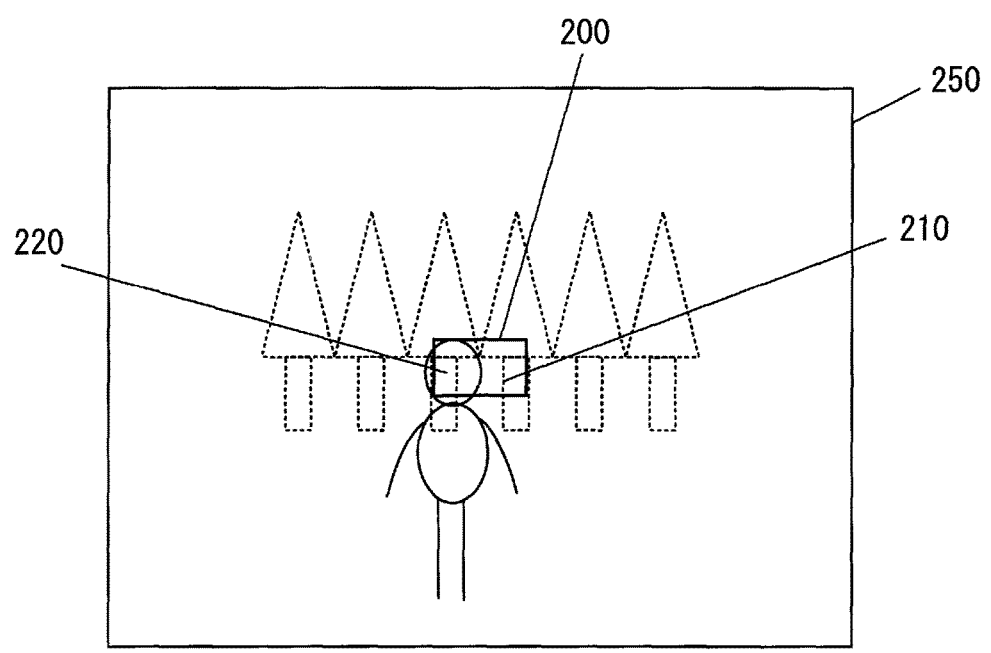
FIG. 5 is a view illustrating one example in which two subject images are included in a focus detection area.

The process steps constituting the focus detection process illustrated in FIG. 4 will be explained with reference to an exemplary photographic screen 250 illustrated in FIG. 5. In FIG. 5, the photographic screen 250 includes two subject images formed by the photographing optical system 4: an subject image 210 of a background including trees and an subject image 220 of a person. A focus detection area 200 is also displayed in the photographic screen 250. The subject image 210 of the background including trees located far from the image-capturing apparatus 100 and the subject image 220 of the person located near the image-capturing apparatus 100 are included also in the focus detection area 200. Although typically a plurality of focus detection areas 200 is displayed on the photographic screen 250, only one focus detection area 200 specified by an user in step S101 in FIG. 4 described later is illustrated in the photographic screen 250 in FIG. 5.

When the focus detection process according to this embodiment is started by the user via an operating member which is not illustrated, the controller 3 makes a decision as to whether or not a focus detection area 200 is specified, in step S101. If No, the process step in step S101 is repeated until the decision result is Yes. If Yes, the controller 3 causes the process to proceed to step S102, with the specified focus detection area 200 being a target of the process. The operating member described above may be an automatic focus detection activation switch, for example, and the process may be started by turning on the automatic focus detection activation switch. Alternatively, the operating member may be a shutter release button and the process may be started by setting the shutter release button in a halfway-press state.

In step S102, the controller 3 performs an photoelectric conversion control of the focus detection sensor 6. The photoelectric conversion control of the focus detection sensor 6 includes an exposure control of the plurality of focus detection pixels 60 arranged in the focus detection sensor 6, a read-out control of the plurality of focus detection signals, and/or an amplification control of the plurality of focus detection signals that has been read out, for example.

In step S103, the controller 3 obtains a pair of focus detection signal sequences on the basis of the plurality of focus detection signals which have been read out in step S102.

In step S104, the controller 3 performs a defocus amount determination process to determine a focus adjustment defocus amount as a defocus amount for focus adjustment. Details of the defocus amount determination process will be described later with reference to FIG. 6.

In step S105, the controller 3 makes a decision as to whether or not the photographing optical system 4 is located at a focus position, depending on whether or not the focus adjustment defocus amount determined in step S104 is approximately zero. If Yes, the process ends. If No, the process proceeds to step S106. It is also possible that the controller 3 makes a decision as to a reliability of the focus adjustment defocus amount determined in step S104, and a scan operation is performed if it is determined that the focus adjustment defocus amount is unreliable and the focus detection is impossible. If the subject image is not present within the focus detection area 200 already after the start of the focus adjustment lens drive, the focus adjustment lens may be driven on the basis of the focus adjustment defocus amount that was most recently detected, before the process ends.

In step S106, the controller 3 calculates the lens drive amount for the photographing optical system 4, on the basis of the focus adjustment defocus amount determined in step S104.

In step S107, the controller 3 sends the lens drive amount calculated in step S106 to the focus adjustment device 8 and controls the focus adjustment device 8 so that the focus adjustment device 8 drives the lens of the photographing optical system 4 via the lens drive motor 5. Upon completion of the process in step S107, the process returns to step S101.

Figure 6:
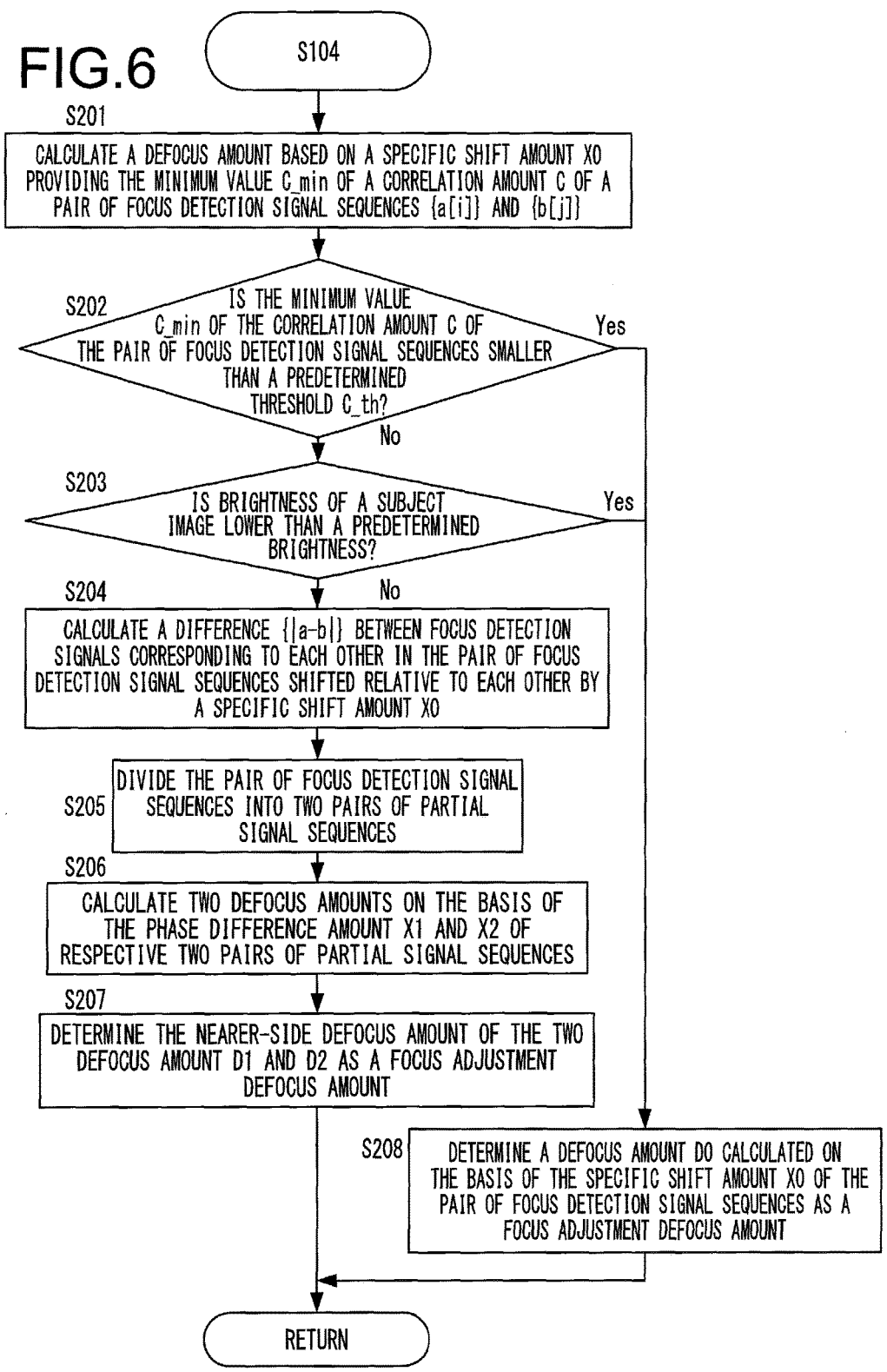
FIG. 6 is a flowchart of a defocus amount determination process performed by the controller.

FIG. 6 is a flowchart detailing the defocus amount determination process performed by the controller 3 in step S104 in FIG. 4. The pair of focus detection signal sequences obtained in step S103 in FIG. 4 will be denoted by {a[i]} and {b[j]}. An initial value of a relative phase shift amount k between the pair of focus detection signal sequences {a[i]} and {b[j]} is 0. As a magnitude of the phase shift amount k becomes closer to the phase difference amount of the pair of focus detection signal sequences {a[i]} and {b[j]}, a correlation between the pair of focus detection signal sequences {a[i]} and {b[j]} becomes higher (k=i−j). With the highest correlation between the pair of focus detection signal sequences {a[i]} and {b[j]}, a correlation value C(k) of the pair of focus detection signal sequences {a[i]} and {b[j]} expressed by the following equation (1) is the minimum value. The summation of the right-hand side of the equation (1) is repeated a number of times equal to the number of signals in the pair of focus detection signal sequences {a[i]} and {b[j]}.

$$C(k)=\Sigma|a[i]-b[j]| \tag{1}$$

In step S201, the controller 3 determines the minimum value C(k)_min of the correlation amount C(k) by sequentially calculating the correlation amount C(k) while shifting phases of the pair of focus detection signal sequences {a[i]} and {b[j]} obtained in step S103 in FIG. 4 relative to each other by a predetermined shift amount for each calculation. The controller 3 obtains a specific shift amount X0 of the pair of focus detection signal sequences {a[i]} and {b[j]} that provides the minimum value C(k)_min, and calculates a defocus amount D0 as a focus detection amount parameter on the basis of the specific shift amount X0.

In step S202, the controller 3 makes a decision as to whether or not the minimum value C(k)_min of the correlation amount C(k) determined in step S201 is smaller than a predetermined threshold C(k)_th. If Yes, the controller 3 causes the process to proceed to step S208. As illustrated in FIG. 5, if a distant-subject image and a near-subject image are included in the focus detection area 200, the pair of focus detection signal sequences {a[i]} and {b[j]} are not identical to each other over the whole focus detection area and there are partial sections where they are not identical (as described later with reference to FIG. 8), even if the phases of the pair of focus detection signal sequences {a[i]} and {b[j]} are shifted relative to each other by the predetermined shift amount (X0) which provides the minimum value C(k)_min of the correlation amount C(k). The minimum value C(k)_min of the correlation amount C(k) therefore deviates from 0. In contrast, if only either the distant-subject image or the near-subject image is present in the focus detection area 200 or if a difference in distances of the distant-subject image and the near-subject image is small, the minimum value C(k)_min of the correlation amount C(k) is close to 0. In such a case, there is no need to apply the present invention. Thus, if the decision result is No in step S202, the controller 3 causes the process to proceed to step S203.

In step S203, the controller 3 makes a decision as to whether or not a brightness of the subject image including the subject image 210 of the background including trees and the subject image 220 of the person is lower than a predetermined brightness in the focus detection area 200 specified in step S101 in FIG. 4. If Yes, i.e., if the brightness of the subject image is lower than the predetermined brightness, it is likely that the amplification control was performed with a large amplification degree in step S102 in FIG. 4. The amplification control with a large amplification degree causes a noise superimposed on the focus detection signal to be amplified. In such a case, the present invention is not applied because it is likely that an error occurs in calculation of a difference between focus detection signals described later in the explanation of step S204. For this reason, the controller 3 causes the process to proceed step S208. If the decision result is No in step S203, the controller 3 causes the process to proceed to step S204.

A magnitude of the amplification degree of the amplification control performed in step S102 in FIG. 4 may be used as a brightness decision index in step S203 in FIG. 6, for example. If the amplification degree is lower than the predetermined value, the controller 3 makes a decision as to that the brightness of the overall subject image is not lower than the predetermined brightness. In other words, the decision result is No in step S203.

In step S204, the controller 3 sequentially calculates absolute values |a[i]−b[j]| of differences between focus detection signals corresponding to each other in the pair of focus detection signal sequences {a[i]} and {b[j]} that have been shifted relative to each other by the specific shift amount X0 obtained in step S201, i.e., the pair of focus detection signal sequences {a[i]} and {b[j]} that have been shifted so as to have the highest correlation, so that a plurality of differences is obtained.

In step S205, the controller 3 divides the pair of focus detection signal sequences {a[i]} and {b[j]} that have been shifted relative to each other by the specific shift amount X0 obtained in step S201 into two pairs of partial signal sequences: a pair of partial signal sequences corresponding to the distant-subject image (the subject image 210 of the background including trees) and a pair of partial signal sequences corresponding to the near-subject image (the subject image 220 of the person). For example, the controller 3 performs the division process in step S205 depending on whether or not each of the plurality of differences obtained from the sequential calculation of the absolute values |a[i]−b[j]| of the differences in step S204 is equal to or higher than the average value of the plurality of differences. Details thereof will be described later with reference to FIG. 9.

In step S206, the controller 3 calculates a phase difference amount between partial signal sequences in each of the two pairs of partial signal sequences obtained in step S205. Two phase difference amounts X1 and X2 calculated in this way, each corresponding to respective one of the two pairs of partial signal sequences, are a type of focus detection parameter. Although process steps subsequent to step S207 may therefore be performed on the basis of the two phase difference amounts X1 and X2, the controller 3 further calculates two defocus amounts D1 and D2 on the basis of the two phase difference amounts X1 and X2 in this embodiment. The two defocus amounts D1 and D2, each corresponding to respective one of the two pairs of partial signal sequences, are also a type of focus detection parameter.

In step S207, the controller 3 determines the nearer-side defocus amount of the two defocus amounts D1 and D2 calculated in step S206 as the focus adjustment defocus amount. The nearer-side defocus amount is determined on the basis of the fact that a focus position of the photographing optical system 4 for the nearest subject to the image-capturing apparatus 100 is located at the farthest position from the photographing optical system 4. The defocus amount corresponding to the nearer subject image (the subject image 220 of the person) of the two defocus amount D1 and D2 calculated in step S206 is the nearer-side defocus amount. Upon completion of step S207, the process ends and the controller 3 causes the focus detection process in FIG. 4 to proceed to step S105.

In step S208, which is performed if the decision result is Yes in step S202 or S203, the controller 3 determines the defocus amount D0 calculated on the basis of the specific shift amount X0 of the pair of focus detection signal sequences {a[i]} and {b[j]} obtained in step S201, as the focus adjustment defocus amount. Upon completion of step S208, the process ends and the controller 3 causes the focus detection process in FIG. 4 to proceed to step S105.

Figure 7:
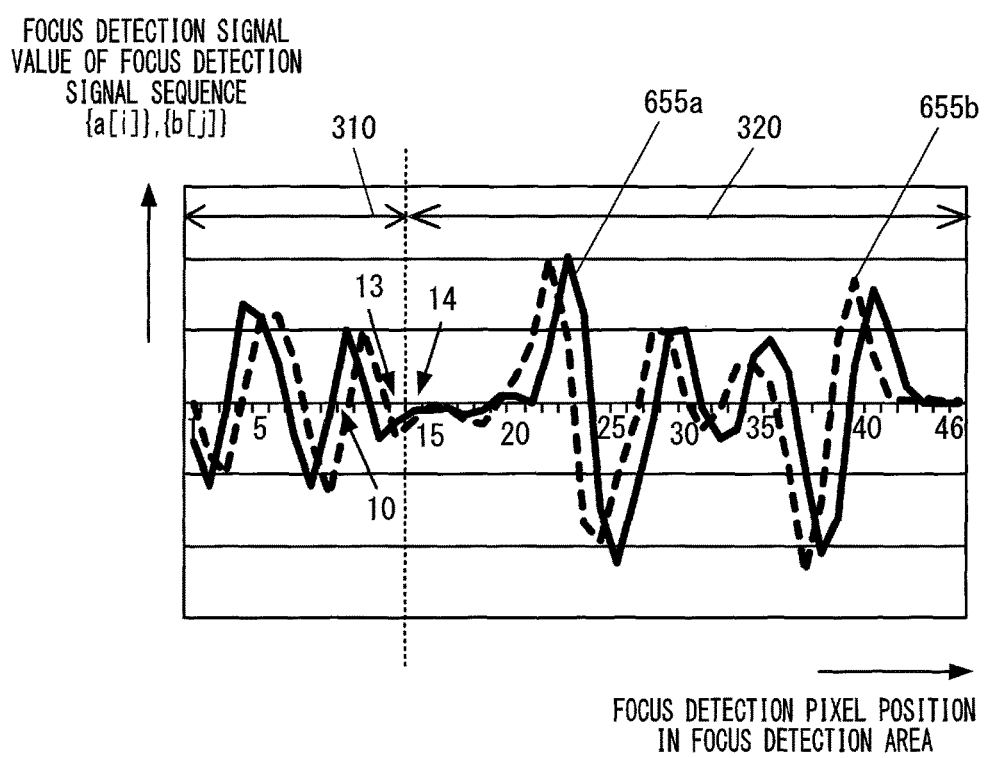
FIG. 7 is a graph illustrating variations of focus detection signal values of a pair of focus detection signal sequences with respect to focus detection pixel positions in the focus detection area.
Figure 8:
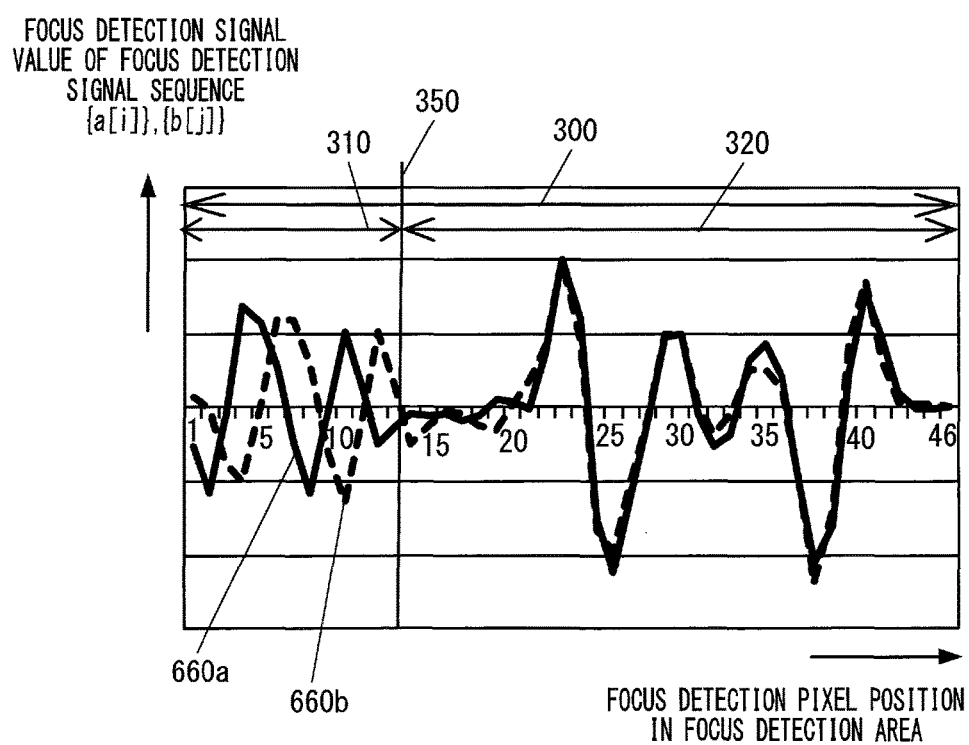
FIG. 8 is a graph illustrating a state where the pair of focus detection signal sequences are shifted relative to each other by a specific shift amount which provides the minimum value of a correlation amount of the pair of the focus detection signal sequences.

FIG. 7 corresponds to the exemplary photographic screen 250 illustrated in FIG. 5 and is a graph illustrating variations of the focus detection signal values of the pair of focus detection signal sequences {a[i]} and {b[j]} with respect to focus detection pixel positions in the focus detection area 200 having a length of approximately 50 pixels in the horizontal direction. A pair of focus detection signal sequences {a[i]} and {b[j]} illustrated in FIG. 7, namely a pair of focus detection signal sequences 655a and 655b, corresponds to the pair of focus detection signal sequences obtained in step S103 in FIG. 4. In FIG. 7, a section 310 of focus detection pixel positions 1 to 13 in the horizontal direction in the focus detection area 200 corresponds to the subject image 220 of the person located near the image-capturing apparatus 100 illustrated in FIG. 5. In this section, a phase of one focus detection signal sequence 655a of the pair of focus detection signal sequences 655a and 655b is ahead of a phase of the other focus detection signal sequence 655b. In FIG. 7, a section 320 of focus detection pixel positions 14 to 46 in the horizontal direction in the focus detection area 200 corresponds to the subject image 210 of the background including trees located far from the image-capturing apparatus 100 illustrated in FIG. 5. In this section, the phase of one focus detection signal sequence 655a of the pair of focus detection signal sequences 655a and 655b is behind the phase of the other focus detection signal sequence 655b. FIG. 8 illustrates a pair of focus detection signal sequences 660a and 660b which is the pair of focus detection signal sequences {a[i]} and {b[j]} in a state where the correlation amount C(k) is the minimum value C(k)_min as a result of the relative shift of the phases of the pair of focus detection signal sequences 655a and 655b by the specific shift amount (X0) performed in step S201 in FIG. 6.

Figure 9:
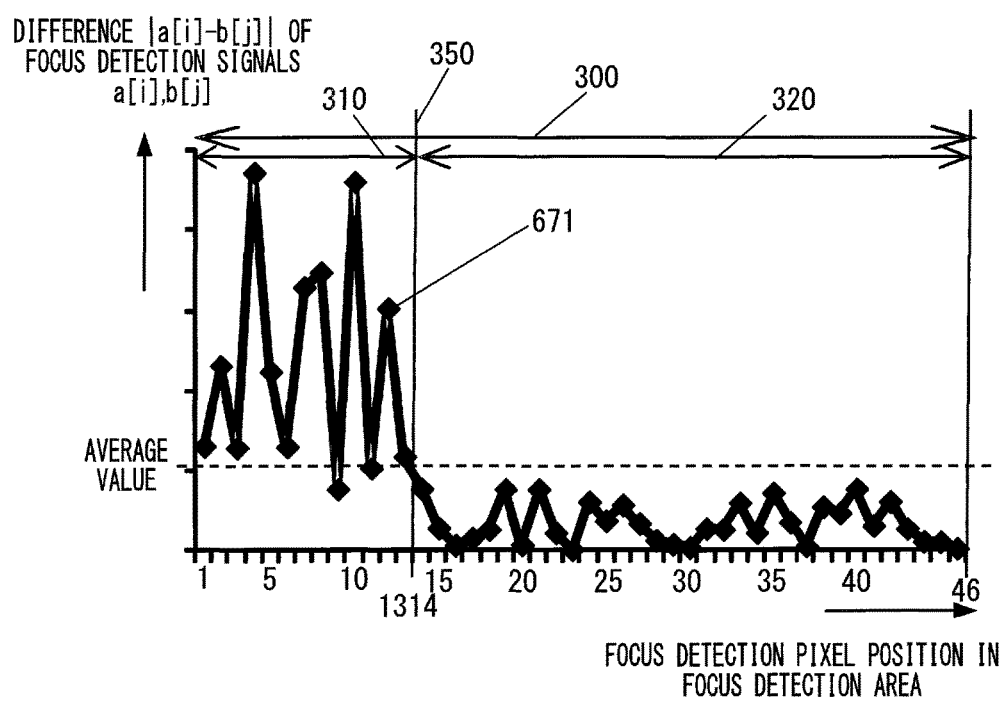
FIG. 9 is a graph explaining a division process for the pair of focus detection signal sequences.

FIG. 8 is a graph illustrating a state where the pair of focus detection signal sequences {a[i]} and {b[j]} in FIG. 7 are shifted relative to each other by the specific shift amount X0 which provides the minimum value C(k)_min of the correlation amount C(k) of the pair of the focus detection signal sequences {a[i]} and {b[j]}. It will be assumed that the correlation between the pair of focus detection signal sequences 655a and 655b is higher because a contrast in a section 320 corresponding to the subject image 210 of the background including trees is higher than that in the section 310 corresponding to the subject image 220 of the person. In such a case, the specific shift amount X0 obtained in step S201 in FIG. 6 may be significantly affected by the subject image 210 of the background including trees. Therefore, if the pair of focus detection signal sequences {a[i]} and {b[j]} in FIG. 7 are shifted relative to each other by the specific shift amount X0, the pair of focus detection signal sequences 660a and 660b may be essentially identical to each other in the section 320 of the focus detection pixel positions 14 to 46 in the horizontal direction in the focus detection area 200 corresponding to the subject image 210 of the background including trees, as illustrated in FIG. 8. As illustrated in FIG. 8, in the section 310 of the focus detection pixel positions 1 to 13 in the horizontal direction in the focus detection area 200 corresponding to the subject image 220 of the person, there are certain phase differences between the pair of focus detection signal sequences 660a and 660b. FIG. 9 explains a way of determining a boundary 350 that divides the whole section 300 in the horizontal direction of the focus detection area 200 into the section 310 corresponding to the subject image 220 of the person and the section 320 corresponding to the subject image 210 of the background including trees as described above, wherein the boundary 350 is located between focus detection pixel positions 13 and 14.

FIG. 9 is a graph explaining the division process for the pair of focus detection signal sequences {a[i]} and {b[j]} illustrated in FIG. 7 and corresponds to the process step in step S204 in FIG. 6. FIG. 9 illustrates variations of a plurality of differences 671, each difference being obtained for each focus detection pixel position in the horizontal direction in the focus detection area 200, by sequentially calculating absolute values |a[i]−b[j]| of differences between focus detection signals corresponding to each other in the pair of focus detection signal sequences 660a and 660b, in the state of FIG. 8 where the pair of focus detection signal sequences {a[i]} and {b[j]} in FIG. 7 have been shifted relative to each other by the specific shift amount X0.

In the section 320 corresponding to the subject image 210 of the background including trees described above within the whole section 300 in the horizontal direction of the focus detection area 200, variations of the absolute values |a[i]−b[j]| of the differences with respect to change in focus detection pixel positions in the horizontal direction in the focus detection area 200 are generally small. In the section 310 corresponding to the subject image 220 of the person described above, the absolute value |a[i]−b[j]| of the difference considerably increases and decreases for each positional change from one focus detection pixel to the next in the horizontal direction in the focus detection area 200. Now, the average value of the plurality of differences 671 over the whole section 300 in the horizontal direction of the focus detection area 200 is determined. Then, none of the absolute values |a[i]−b[j]| of the differences is equal to or higher than the average value in the section 320 corresponding to the subject image 210 of the background including trees, while there are a large number of absolute values |a[i]−b[j]| of differences that are equal to or higher than the average value in the section 310 corresponding to the subject image 220 of the person. Therefore, in FIG. 9, the section in which each and all of the plurality of differences 671 is lower than the average value of the plurality of differences 671 with respect to change in focus detection pixel positions in the horizontal direction in the focus detection area 200, i.e., the section of the focus detection pixel positions 14 to 46 is specified as the section 320, and the boundary 350 can be specified so as to be located between the focus detection pixel positions 13 and 14. The section of the focus detection pixel positions 1 to 13 within the whole section 300, which is the opposite side of the boundary 350 to the section 320, can be specified as the section 310. On the basis of this result, in step S205 in FIG. 6, the pair of focus detection signal sequences 655a and 655b illustrated in FIG. 7 indicating a current focusing condition can be divided into the pair of partial signal sequences in the section 310 of the focus detection pixel positions 1 to 13 corresponding to the subject image 220 of the person, and the pair of partial signal sequences in the section 320 of the focus detection pixel positions 14 to 46 corresponding to the subject image 210 of the background including trees.

Figure 10:
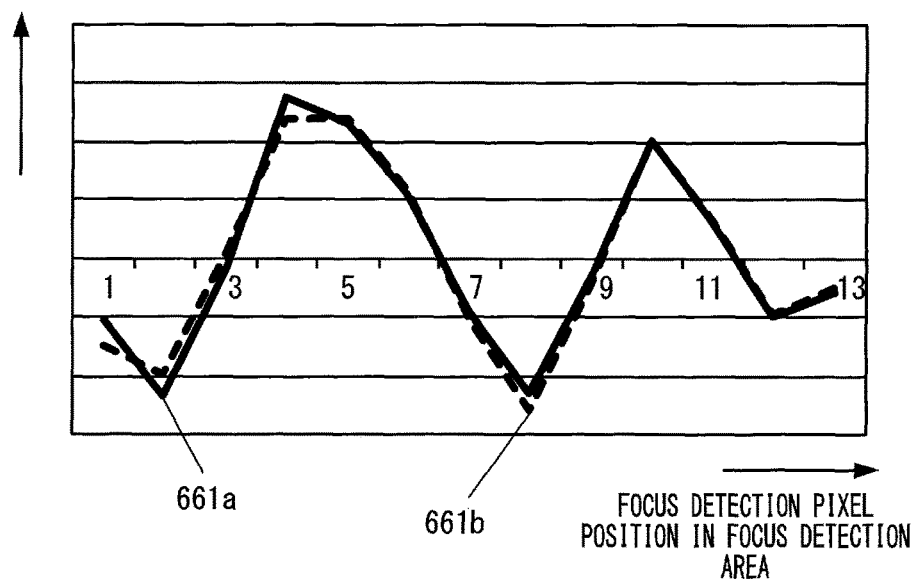
FIG. 10 is a graph illustrating variations of focus detection signal values in a state where the correlation amount in the pair of partial signal sequences is the minimum value.

FIG. 10 is a graph illustrating variations of focus detection signal values of a pair of partial signal sequences 661a and 661b in a state where the correlation amount of the pair of partial signal sequences in the section of the focus detection pixel positions 1 to 13 corresponding to the subject image 220 of the person is the minimum value. As described above, in step S205 in FIG. 6, a pair of partial signal sequences in the section of the focus detection pixel positions 1 to 13 corresponding to the subject image 220 of the person is obtained by dividing the pair of focus detection signal sequences 655a and 655b illustrated in FIG. 7. A phase difference amount X1 of the pair of partial signal sequences is obtained by performing a correlation operation while shifting phases of the pair of partial signal sequences in the section of the focus detection pixel positions 1 to 13 corresponding to the subject image 220 of the person. FIG. 10 illustrates a state where the pair of partial signal sequences in the section of the focus detection pixel positions 1 to 13 corresponding to the subject image 220 of the person are shifted relative to each other by the phase difference amount X1. In step S206 in FIG. 6, the defocus amount D1 is calculated on the basis of the phase difference amount X1.

Figure 11:
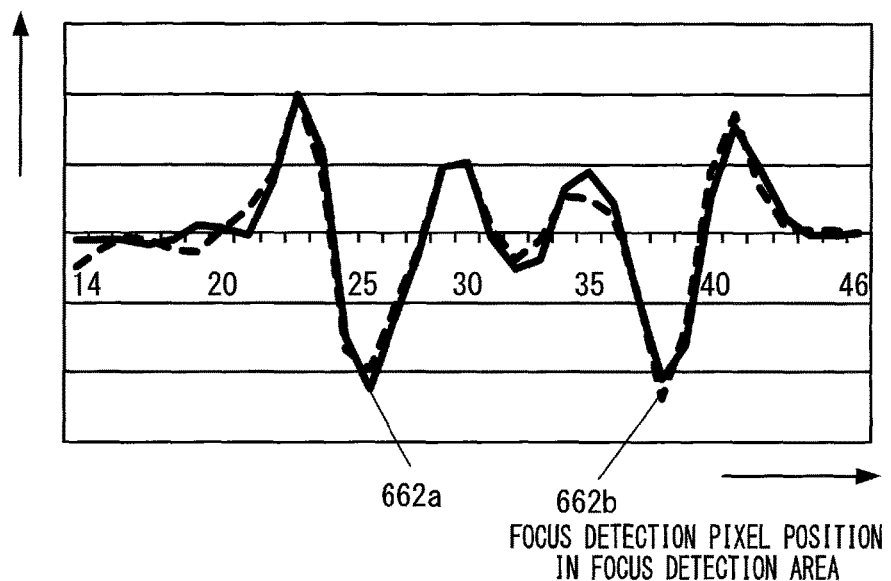
FIG. 11 is a graph illustrating variations of focus detection signal values in a state where the correlation amount in the pair of partial signal sequences is the minimum value.

FIG. 11 is a graph illustrating variations of focus detection signal values of a pair of partial signal sequences 662a and 662b in a state where the correlation amount of the pair of partial signal sequences in the section of the focus detection pixel positions 14 to 46 corresponding to the subject image 210 of the background including trees is the minimum value. As described above, in step S205 in FIG. 6, a pair of partial signal sequences in the section of the focus detection pixel positions 14 to 46 corresponding to the subject image 210 of the background including trees is obtained by dividing the pair of focus detection signal sequences 655a and 655b illustrated in FIG. 7. A phase difference amount X2 of the pair of partial signal sequences is obtained by performing a correlation operation while shifting phases of the pair of partial signal sequences in the section of the focus detection pixel positions 14 to 46 corresponding to the subject image 210 of the background including trees. FIG. 11 illustrates a state where the pair of partial signal sequences in the section of the focus detection pixel positions 14 to 46 corresponding to the subject image 210 of the background including trees are shifted relative to each other by the phase difference amount X2. In step S206 in FIG. 6, the defocus amount D2 is calculated on the basis of the phase difference amount X2.

Figure 12:
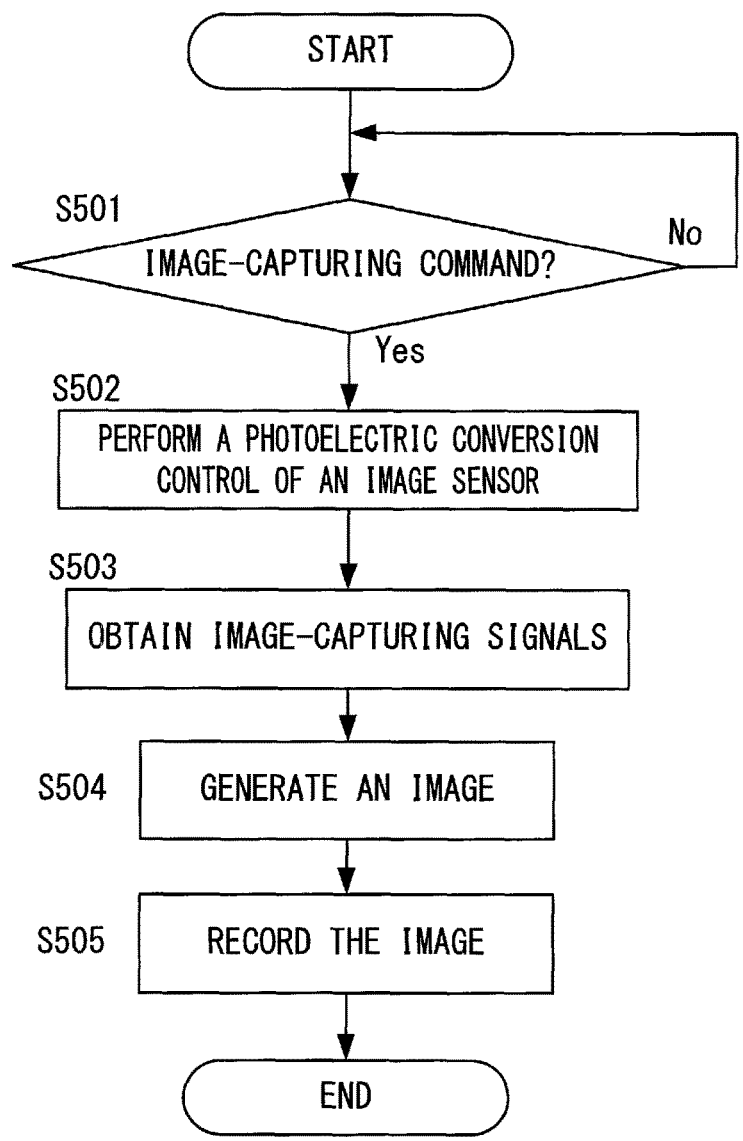
FIG. 12 is a flowchart of an image-capturing process performed by the controller.

FIG. 12 is a flowchart of the image-capturing process performed by the controller 3. As described above, the controller 3 is a computer including a CPU and a memory, for example. The CPU executes a computer program stored in the memory to perform process steps constituting the image-capturing process illustrated in FIG. 12.

In step S501, the controller 3 makes a decision as to whether or not the user issues an image-capturing command via the operating member. If No, the process step in step S501 is repeated until the decision result is Yes. If Yes, the controller 3 causes the process to proceed to step S502. The operating member may be a shutter release button, for example, and the decision result is Yes in step S501 if the shutter release button is set in a full-press state.

In step S502, the controller 3 performs an photoelectric conversion control of the image sensor 2. The photoelectric conversion control of the image sensor 2 includes an exposure control of the plurality of image-capturing pixels arranged in the image sensor 2, a read-out control of the plurality of image-capturing signals, and/or an amplification control of the plurality of image-capturing signals that has been read out, for example.

In step S503, the controller 3 obtains the plurality of image-capturing signals which has been read out in step S502 and on which the amplification control has been performed.

In step S504, the controller 3 generates an image on the basis of the plurality of image-capturing signals obtained in step S503.

In step S505, the controller 3 records the image generated in step S504 in the storage device 15. Upon completion of step S505, the process ends.

The focus detection device 50 according to this embodiment includes the focus detection sensor 6 and the controller 3, as described above. The focus detection sensor 6 receives the pair of light fluxes having passed through the pair of pupil regions of the photographing optical system 4 and outputs the pair of focus detection signal sequences 655a and 655b, each being made of the plurality of focus detection signals. The controller 3 sequentially calculates absolute values |a[i]−b[j]| of differences between focus detection signals corresponding to each other in the pair of focus detection signal sequences 655a and 655b, so that a plurality of differences 671 is obtained. Based on the plurality of differences 671 obtained here, the controller 3 divides the pair of focus detection signal sequences 655a and 655b into at least two pairs of partial signal sequences: a pair of partial signal sequences corresponding to the subject image 220 of the person located near the image-capturing apparatus 100 and a pair of partial signal sequences corresponding to the subject image 210 of the background including trees located far from the image-capturing apparatus 100. The controller 3 calculates the defocus amount D1 in accordance with the phase difference amount X1 of the pair of partial signal sequences corresponding to the subject image 220 of the person and the defocus amount D2 in accordance with the phase difference amount X2 of the pair of partial signal sequences corresponding to the subject image 210 of the background including trees. The controller 3 determines either one of the defocus amounts D1 and D2 as the focus adjustment defocus amount used for the focus adjustment. Thus, either the subject image 210 of the background including trees located far from the image-capturing apparatus 100 or the subject image 220 of the person located near the image-capturing apparatus 100 can be in focus.

The controller 3 calculates the defocus amounts D1 and D2 and determines the nearer-side defocus amount of the defocus amounts D1 and D2 as the focus adjustment defocus amount. Thus, the subject image 220 of the person located near the image-capturing apparatus 100 can be in focus.

VARIATIONS (1) Although in the above-described embodiment, the present invention is applied to the example where two subject images are included in the focus detection area 200 as illustrated in FIG. 5, the present invention may be applied to a case where three or more subject images are included in the focus detection area 200. This will be described with reference to FIG. 13.

Figure 13:
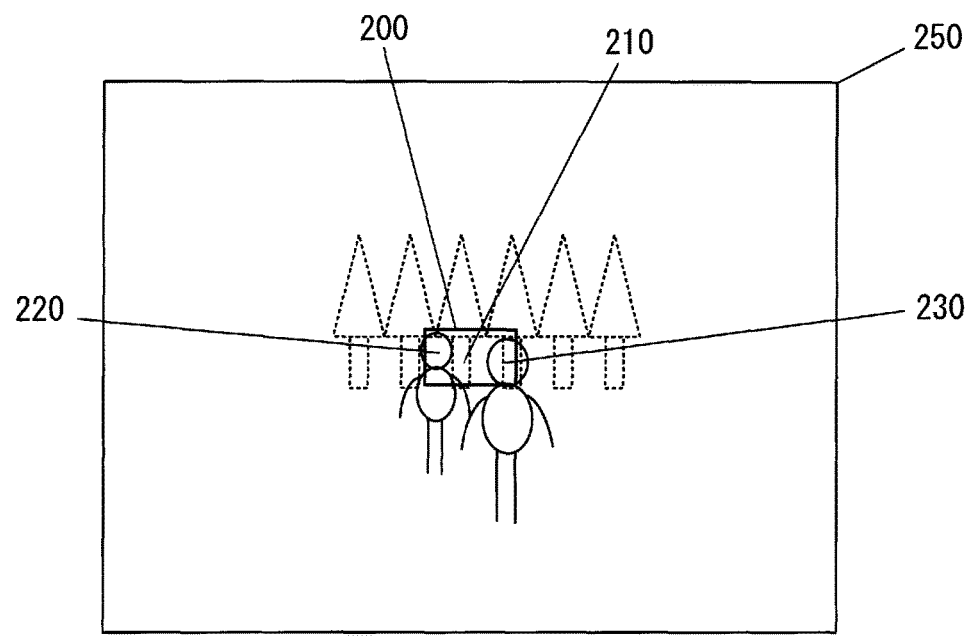
FIG. 13 is a view illustrating one example in which three subject images are included in a focus detection area.

FIG. 13 is a view illustrating an example where three subject images 210, 220, and 230 are included in the focus detection area 200 in the photographic screen 250. The photographic screen 250 and the focus detection area 200 include the subject image 210 of a background including trees, the subject image 220 of one person, and the subject image 230 of another person. Although typically a plurality of focus detection areas 200 is displayed on the photographic screen 250, only one focus detection area 200 specified by an user is illustrated in the photographic screen 250 in FIG. 13. On the basis of the example illustrated in FIG. 13, the focus detection process performed by the controller 18 will be described with reference to FIGS. 14 to 19.

Figure 14:
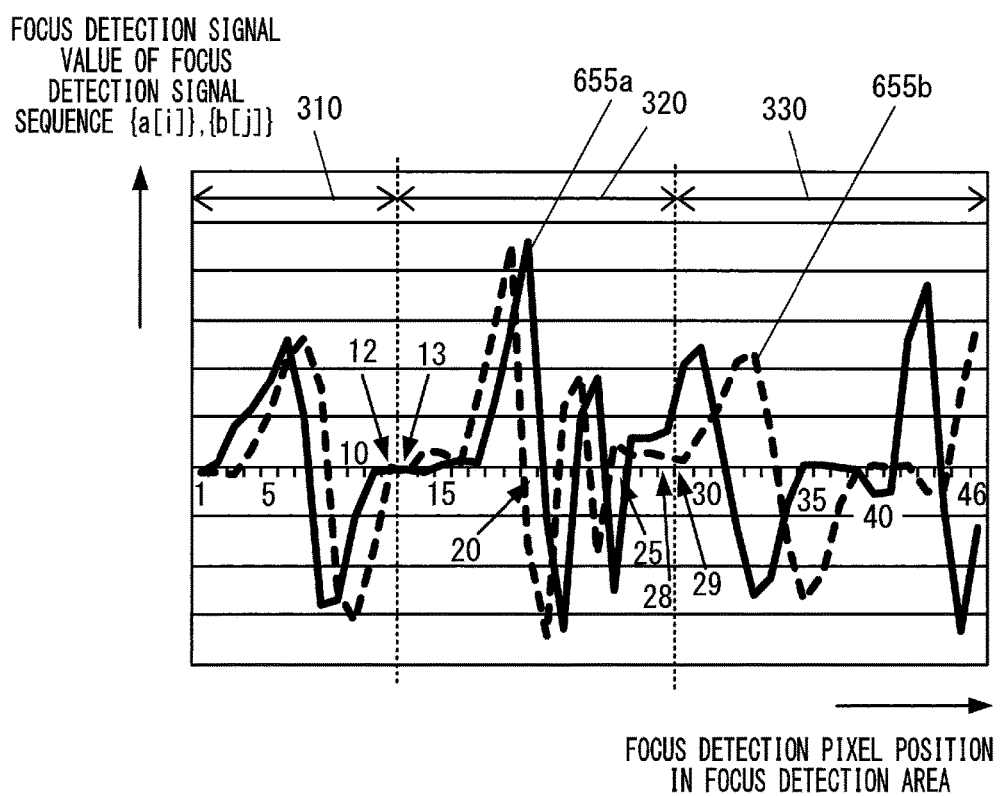
FIG. 14 is a graph illustrating variations of focus detection signal values of a pair of focus detection signal sequences with respect to focus detection pixel positions in the focus detection area.
Figure 15:
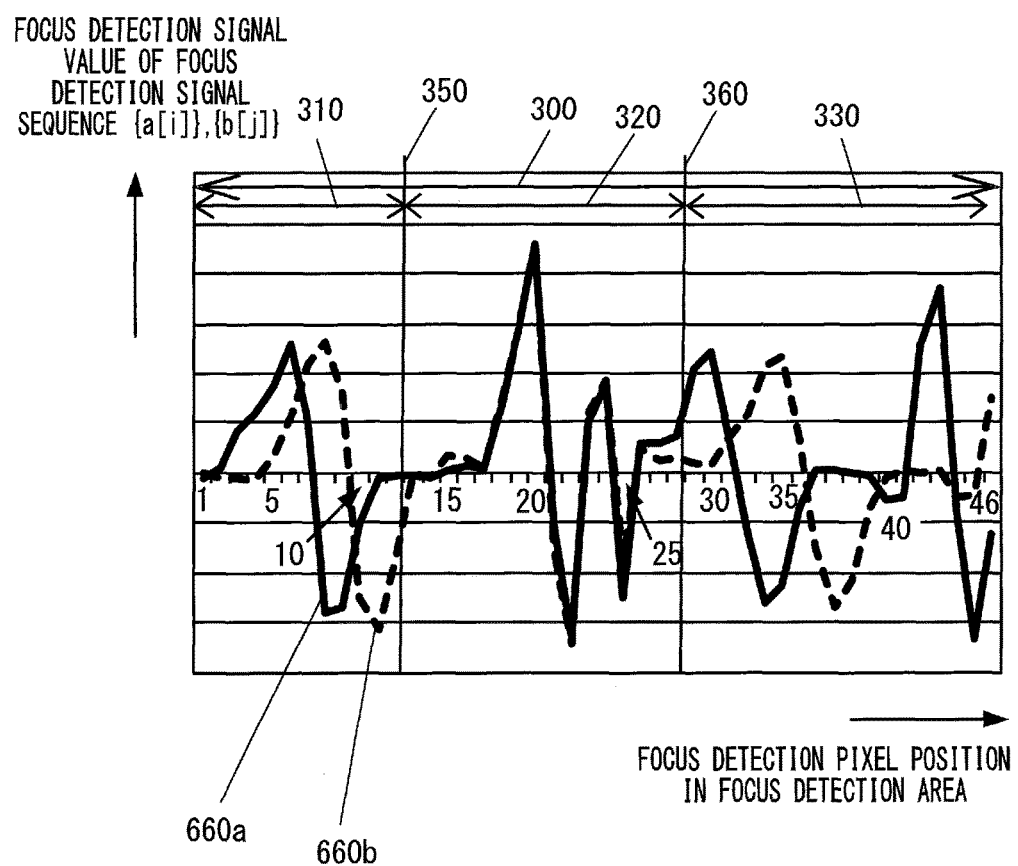
FIG. 15 is a graph illustrating a state where the pair of focus detection signal sequences are shifted relative to each other by a specific shift amount which provides the minimum value of a correlation amount of the pair of the focus detection signal sequences.

FIG. 14 corresponds to the exemplary photographic screen 250 illustrated in FIG. 13 and is a graph illustrating variations of the focus detection signal values of the pair of focus detection signal sequences {a[i]} and {b[j]} with respect to focus detection pixel positions in the focus detection area 200 having a length of approximately 50 pixels in the horizontal direction. A pair of focus detection signal sequences {a[i]} and {b[j]} illustrated in FIG. 14, namely a pair of focus detection signal sequences 655*a* and 655*b*, corresponds to the pair of focus detection signal sequences obtained by means of a process according to step S103 in FIG. 4. In FIG. 14, a section 310 of focus detection pixel positions 1 to 12 in the horizontal direction in the focus detection area 200 corresponds to the subject image 220 of the one person located near the image-capturing apparatus 100 illustrated in FIG. 13. In this section, a phase of one focus detection signal sequence 655*a* of the pair of focus detection signal sequences 655*a* and 655*b* is behind a phase of the other focus detection signal sequence 655*b*. In FIG. 14, a section 320 of focus detection pixel positions 13 to 28 in the horizontal direction in the focus detection area 200 corresponds to the subject image 210 of the background including trees located far from the image-capturing apparatus 100 illustrated in FIG. 13. In this section, a phase of one focus detection signal sequence 655*a* of the pair of focus detection signal sequences 655*a* and 655*b* is ahead of a phase of the other focus detection signal sequence 655*b*. In FIG. 14, a section 330 of focus detection pixel positions 29 to 46 in the horizontal direction in the focus detection area 200 corresponds to the subject image 230 of the another person who is the nearest subject to the image-capturing apparatus 100 illustrated in FIG. 13. In this section, the phase of one focus detection signal sequence 655*a* of the pair of focus detection signal sequences 655*a* and 655*b* is significantly behind the phase of the other focus detection signal sequence 655*b*. FIG. 15 illustrates a pair of focus detection signal sequences 660*a* and 660*b* which is the pair of focus detection signal sequences {a[i]} and {b[j]} in a state where the correlation amount C(k) is the minimum value C(k)_min as a result of the relative shift of the phases of the pair of focus detection signal sequences 655*a* and 655*b* by the specific shift amount (X0) performed by means of a process according to step S201 in FIG. 6.

FIG. 15 is a graph illustrating a state where the pair of focus detection signal sequences {a[i]} and {b[j]} in FIG. 14 are shifted relative to each other by the specific shift amount X0 which provides the minimum value C(k)_min of the correlation amount C(k) of the pair of the focus detection signal sequences {a[i]} and {b[j]}. In FIG. 13, in the horizontal direction of the focus detection area 200, the subject image 220 of one person is located on the left side of the focus detection area 200 in the figure, the subject image 210 of the background including trees is located in the center, and the subject image 230 of another person is located on the right side. It will be assumed that the correlation between the pair of focus detection signal sequences 655*a* and 655*b* in the section 320 corresponding to the subject image 210 of the background including trees is higher than that in the section 310 corresponding to the subject image 220 of the one person and in the section 330 corresponding to the subject image 230 of the another person because a contrast in the section 320 is higher than that in the section 310 and in the section 330. In such a case, the specific shift amount X0 obtained by means of the process according to step S201 in FIG. 6 may be significantly affected by the subject image 210 of the background including trees. In such a case, if the pair of focus detection signal sequences {a[i]} and {b[j]} in FIG. 14 are shifted relative to each other by the specific shift amount X0, the pair of focus detection signal sequences 660*a* and 660*b* may be essentially identical to each other in the section 320 of the focus detection pixel positions 13 to 28 in the horizontal direction in the focus detection area 200 corresponding to the subject image 210 of the background including trees, as illustrated in FIG. 15.

Figure 16:
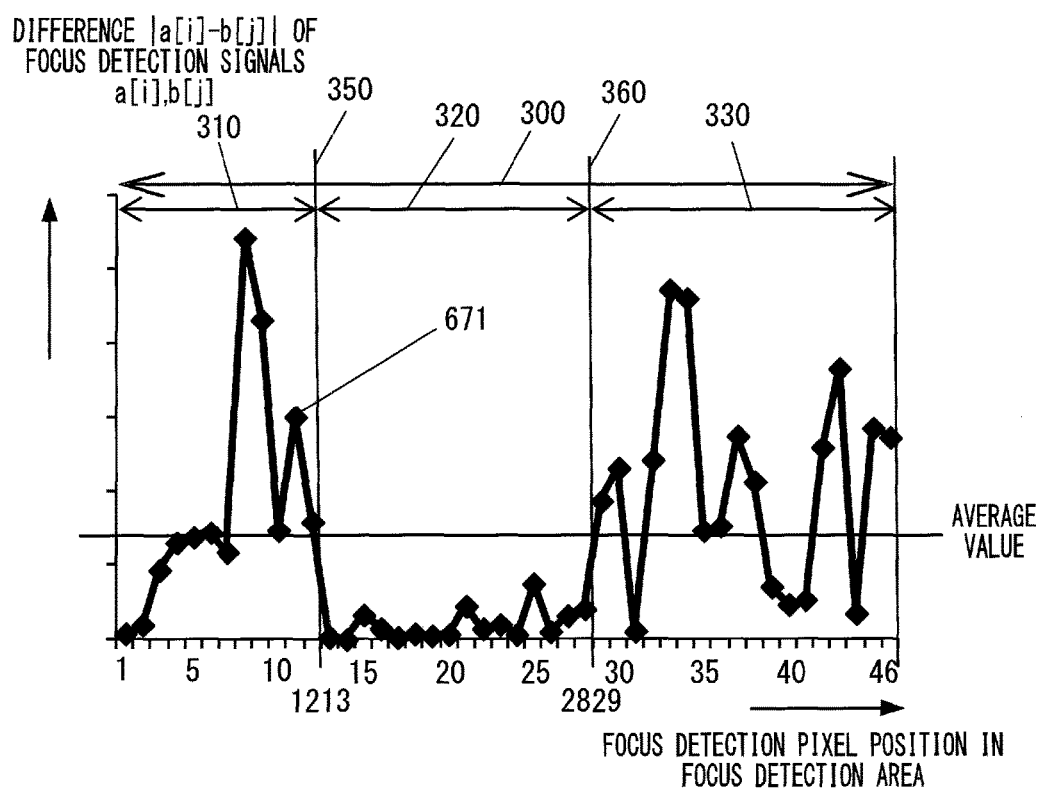
FIG. 16 is a graph explaining a division process for the pair of focus detection signal sequences.

As illustrated in FIG. 15, in the section 310 of the focus detection pixel positions 1 to 12 in the horizontal direction in the focus detection area 200 corresponding to the subject image 220 of the one person, there are certain phase differences between the pair of focus detection signal sequences 660*a* and 660*b*. As illustrated in FIG. 15, in the section 330 of the focus detection pixel positions 29 to 46 in the horizontal direction in the focus detection area 200 corresponding to the subject image 230 of the another person, there are certain phase differences between the pair of focus detection signal sequences 660*a* and 660*b*. FIG. 16 explains a way of determining a boundary 350 that divides the whole section 300 in the horizontal direction of the focus detection area 200 into the section 310 corresponding to the subject image 220 of the one person and the section 320 corresponding to the subject image 210 of the background including trees as described above, wherein the boundary 350 is located between focus detection pixel positions 12 and 13; and further determining a boundary 360 that divides the section 300 into the section 320 corresponding to the subject image 210 of the background including trees and the section 330 corresponding to the subject image 230 of the another person.

FIG. 16 is a graph explaining the division process for the pair of focus detection signal sequences {a[i]} and {b[j]} illustrated in FIG. 14 and corresponds to a process according to step S204 in FIG. 6. FIG. 16 illustrates variations of a plurality of differences 671, each difference being obtained for each focus detection pixel position in the horizontal direction in the focus detection area 200, by sequentially calculating absolute values |a[i]−b[j]| of differences between focus detection signals corresponding to each other in the pair of focus detection signal sequences 660a and 660b, in the state of FIG. 15 where the pair of focus detection signal sequences {a[i]} and {b[j]} in FIG. 14 have been shifted relative to each other by the specific shift amount X0. In the section 320 corresponding to the subject image 210 of the background including trees described above within the whole section 300 in the horizontal direction of the focus detection area 200, variations of the absolute values |a[i]−b[j]| of the differences with respect to change in focus detection pixel positions in the horizontal direction in the focus detection area 200 are generally small.

In the section 310 corresponding to the subject image 220 of the one person and the section 330 corresponding to the subject image 230 of the another person as described above, the absolute value |a[i]−b[j]| of the difference considerably increases and decreases for each positional change from one focus detection pixel to the next in the horizontal direction in the focus detection area 200. Now, the average value of the plurality of differences 671 over the whole section 300 in the horizontal direction of the focus detection area 200 is determined. Then, none of the absolute values |a[i]−b[j]| of the differences is equal to or higher than the average value, in the section 320 corresponding to the subject image 210 of the background including trees, while there are a large number of absolute values |a[i]−b[j]| of differences that are equal to or higher than the average value, in the section 310 corresponding to the subject image 220 of the one person and in the section 330 corresponding to the subject image 230 of the another person. Therefore, in FIG. 16, the section in which each and all of the plurality of differences 671 is lower than the average value of the plurality of differences 671 with respect to change in focus detection pixel positions in the horizontal direction in the focus detection area 200, i.e., the section of the focus detection pixels 13 to 28 is specified as the section 320, and the boundaries 350 and 360 can be specified so as to be respectively located between the focus detection pixel positions 12 and 13 and between the focus detection pixel positions 28 and 29. The section of the focus detection pixel positions 1 to 12 in the whole section 300, which is the opposite side of the boundary 350 to the section 320, can be specified as the section 310, and the section of the focus detection pixel positions 29 to 46 in the whole section 300, which is the opposite side of the boundary 360 to the section 320, can be specified as the section 330. On the basis of this result, in the process of dividing into three parts which can be performed according to step S205 in FIG. 6, the pair of focus detection signal sequences 655a and 655b illustrated in FIG. 14 indicating a current focusing condition can be divided into the pair of partial signal sequences in the section of the focus detection pixel positions 1 to 12 corresponding to the subject image 220 of the one person, the pair of partial signal sequences in the section of the focus detection pixel positions 13 to 28 corresponding to the subject image 210 of the background including trees, and the pair of partial signal sequences in the section of the focus detection pixel positions 29 to 46 corresponding to the subject image 230 of the another person.

Figure 17:
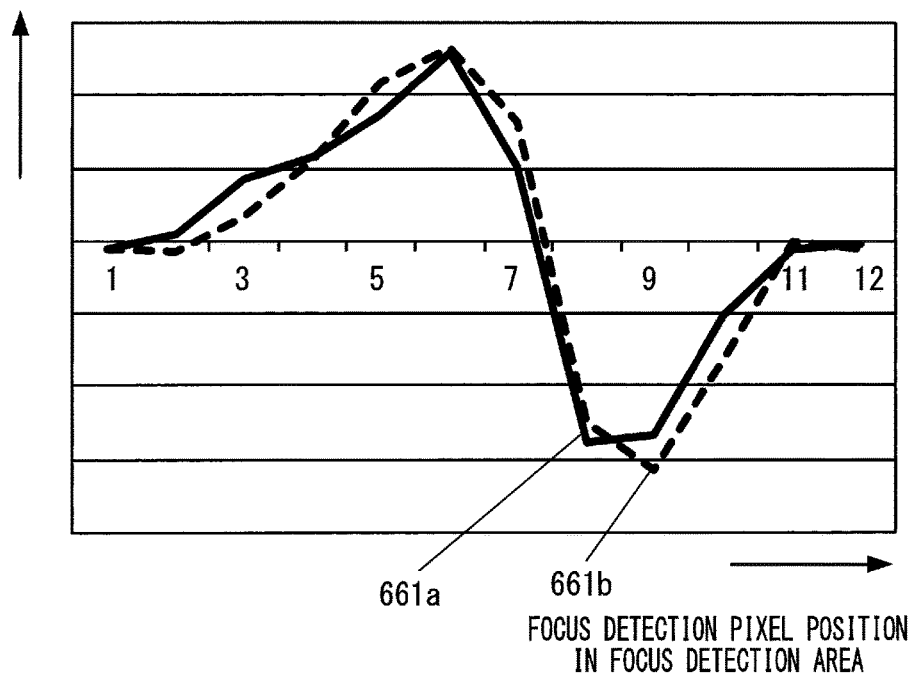
FIG. 17 is a graph illustrating variations of focus detection signal values in a state where the correlation amount in the pair of partial signal sequences is the minimum value.

FIG. 17 is a graph illustrating variations of focus detection signal values of a pair of partial signal sequences 661a and 661b in a state where the correlation amount of the pair of partial signal sequences in the section of the focus detection pixel positions 1 to 12 corresponding to the subject image 220 of the one person is the minimum value. As described above, in the process of dividing into three parts which can be performed according to step S205 in FIG. 6, a pair of partial signal sequences in the section of the focus detection pixel positions 1 to 12 corresponding to the subject image 220 of the one person is obtained by dividing the pair of focus detection signal sequences 655a and 655b illustrated in FIG. 14. A phase difference amount X1 of the pair of partial signal sequences is obtained by performing a correlation operation while shifting phases of the pair of partial signal sequences in the section of the focus detection pixel positions 1 to 12 corresponding to the subject image 220 of the one person. FIG. 17 illustrates a state where the pair of partial signal sequences in the section of the focus detection pixel positions 1 to 12 corresponding to the subject image 220 of the one person are shifted relative to each other by the phase difference amount X1. In the process according to step S206 in FIG. 6, the defocus amount D1 is calculated on the basis of the phase difference amount X1.

Figure 18:
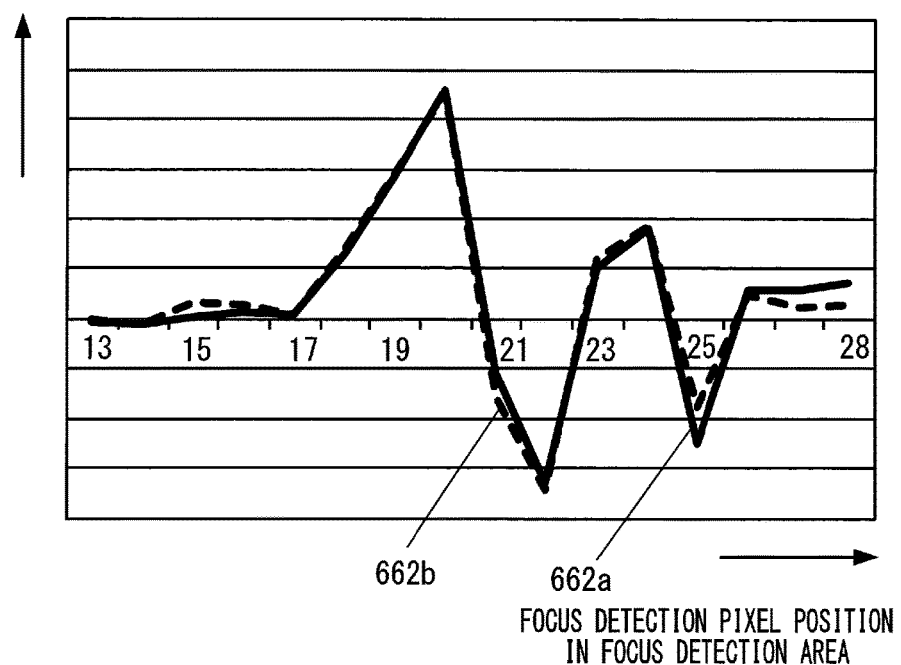
FIG. 18 is a graph illustrating variations of focus detection signal values in a state where the correlation amount in the pair of partial signal sequences is the minimum value.

FIG. 18 is a graph illustrating variations of focus detection signal values of a pair of partial signal sequences 662a and 662b in a state where the correlation amount of the pair of partial signal sequences in the section of the focus detection pixel positions 13 to 28 corresponding to the subject image 210 of the background including trees is the minimum value. As described above, in the process of dividing in three which can be performed according to step S205 in FIG. 6, a pair of partial signal sequences in the section of the focus detection pixel positions 13 to 28 corresponding to the subject image 210 of the background including trees is obtained by dividing the pair of focus detection signal sequences 655a and 655b illustrated in FIG. 14. A phase difference amount X2 of the pair of partial signal sequences is obtained by performing a correlation operation while shifting phases of the pair of partial signal sequences in the section of the focus detection pixel positions 13 to 28 corresponding to the subject image 210 of the background including trees. FIG. 18 illustrates a state where the pair of partial signal sequences in the section of the focus detection pixel positions 13 to 28 corresponding to the subject image 210 of the background including trees are shifted relative to each other by the phase difference amount X2. In the process according to step S206 in FIG. 6, the defocus amount D2 is calculated on the basis of the phase difference amount X2.

Figure 19:
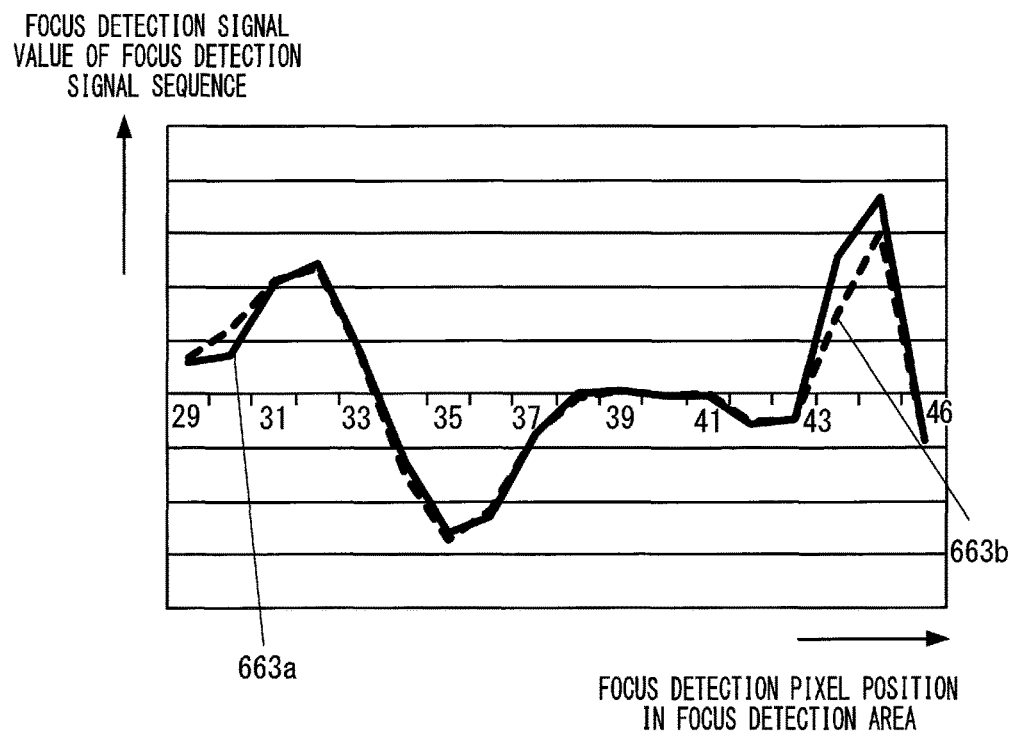
FIG. 19 is a graph illustrating variations of focus detection signal values in a state where the correlation amount in the pair of partial signal sequences is the minimum value.

FIG. 19 is a graph illustrating variations of focus detection signal values of a pair of partial signal sequences 663a and 663b in a state where the correlation amount of the pair of partial signal sequences in the section of the focus detection pixel positions 29 to 46 corresponding to the subject image 230 of the another person is the minimum value. As described above, in the process of dividing in three which can be performed according to step S205 in FIG. 6, a pair of partial signal sequences in the section of the focus detection pixel positions 29 to 46 corresponding to the subject image 230 of the another person is obtained by dividing the pair of focus detection signal sequences 655a and 655b illustrated in FIG. 14. A phase difference amount X3 of the pair of partial signal sequences is obtained by performing a correlation operation while shifting phases of the pair of partial signal sequences in the section of the focus detection pixel positions 29 to 46 corresponding to the subject image 230 of the another person. FIG. 19 illustrates a state where the pair of partial signal sequences in the section of the focus detection pixel positions 29 to 46 corresponding to the subject image 230 of the another person are shifted relative to each other by the phase difference amount X3. In the process according to step S206 in FIG. 6, the defocus amount D3 is calculated on the basis of the phase difference amount X3.

(2) In step S205 in FIG. 6 according to one embodiment as described above, the controller 3 performs the division process in step S205 depending on whether or not each of the plurality of differences 671 as illustrated in FIG. 9 obtained from the sequential calculation of the absolute values |a[i]−b[j]| of the differences in step S204 is equal to or higher than the average value of the plurality of differences 671. However, other methods may be used. For example, the controller 3 calculates differential values of the plurality of differences 671. The differential value is obtained by calculating a difference between absolute values |a[i]−b[j]| of two differences at adjacent focus detection pixel positions in the horizontal direction in the focus detection area 200, over the whole range of the focus detection pixel positions 1 to 46. FIG. 22 is a graph illustrating differences between the absolute values |a[i]−b[j]| of the differences illustrated in FIG. 9.

With reference to FIG. 9, in the section 320 corresponding to the subject image 210 of the background including trees described above within the whole section 300 in the horizontal direction of the focus detection area 200, variations of the absolute values |a[i]−b[j]| of the differences with respect to change in focus detection pixel positions in the horizontal direction in the focus detection area 200 are generally small, as described above. Therefore, as illustrated in FIG. 22, magnitudes of the differential values in the section 320 are smaller than the predetermined value V which is close to 0. In the section 310 corresponding to the subject image 220 of the person described above, the absolute value |a[i]−b[j]| of the difference considerably increases and decreases for each positional change from one focus detection pixel to the next in the horizontal direction in the focus detection area 200. Therefore, as illustrated in FIG. 22, magnitudes of the differential values in the section 310 are equal to or higher than the predetermined value V described above. In other words, in step S205 in FIG. 6, the controller 3 may divide the pair of focus detection signal sequences 655*a* and 655*b* into a pair of partial signal sequences corresponding to the subject image 220 of the person located near the image-capturing apparatus 100 and a pair of partial signal sequences corresponding to the subject image 210 of the background including trees located far from the image-capturing apparatus 100, depending on whether or not a magnitude of a differential value which is a difference between absolute values |a[i]−b[j]| of differences adjacent to each other in the plurality of differences 671 obtained in step S204 is lower than a predetermined value V.

(3) In step S203 in FIG. 6 according to one embodiment described above, the controller 3 makes a decision as to whether or not the brightness of the whole subject image including the subject image 210 of the background including trees and the subject image 220 of the person is lower than the predetermined brightness. As described above, in the case where the brightness of the whole subject image is lower than the predetermined brightness, noises superimposed on the focus detection signals are also amplified. Therefore, if the plurality of differences is obtained in step S204 without the process step in step S203, absolute values |a[i]−b[j]| of differences that are equal to or higher than the average value are included also in the section of the focus detection pixel positions 14 to 46 corresponding to the subject image 210 of the background including trees in FIG. 9. Thus, the controller 3 may cause the process to proceed to step S208 if it is determined that there are absolute values |a[i]−b[j]| of differences that are equal to or higher than the average value over the whole section 300 in the horizontal direction of the focus detection area 200 in step S204 without the process step in step S203.

(4) In the above-described embodiment, in step S206 and step S207 in FIG. 6, the controller 3 makes a decision as to the nearer-side defocus amount of the two defocus amounts D1 and D2 calculated on the basis of the two phase difference amounts X1 and X2, each corresponding to respective one of the two pairs of partial signal sequences, as the focus adjustment defocus amount. However, the controller 3 may determine one defocus amount calculated on the basis of the nearer-side phase difference amount of the two phase difference amounts X1 and X2, each corresponding to respective one of the two pairs of partial signal sequences, as the focus adjustment defocus amount.

(5) In the above-described embodiment, in step S105 in FIG. 4, the controller 3 determines whether or not the photographing optical system 4 is located at a focus position, depending on whether or not the focus adjustment defocus amount determined in step S104 is approximately zero. However, it is also possible that step S106 is performed first and, depending on whether or not the lens drive amount of the photographing optical system 4 calculated in step S106 is approximately 0, it is determined whether or not the photographing optical system 4 is located at a focus position.

(6) In the above-described embodiment, the controller 3 performs the focus adjustment control by driving the lens of the photographing optical system 4 on the basis of the focus adjustment defocus amount, in step S106 and step S107 in FIG. 4. However, the controller 3 may perform the focus adjustment control by driving the image sensor 2 on the basis of the focus adjustment defocus amount.

Figure 20:
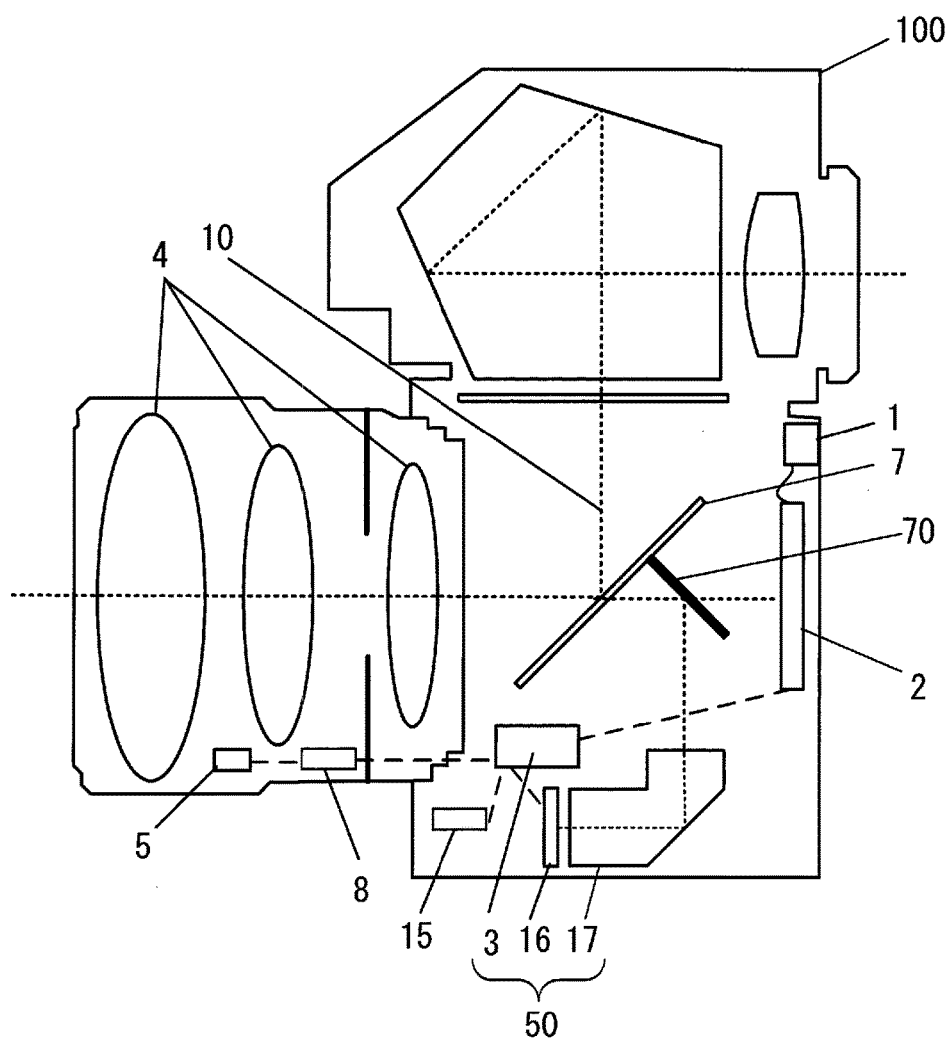
FIG. 20 is a view illustrating a configuration of an image-capturing apparatus having another focus detection device.
Figure 21:
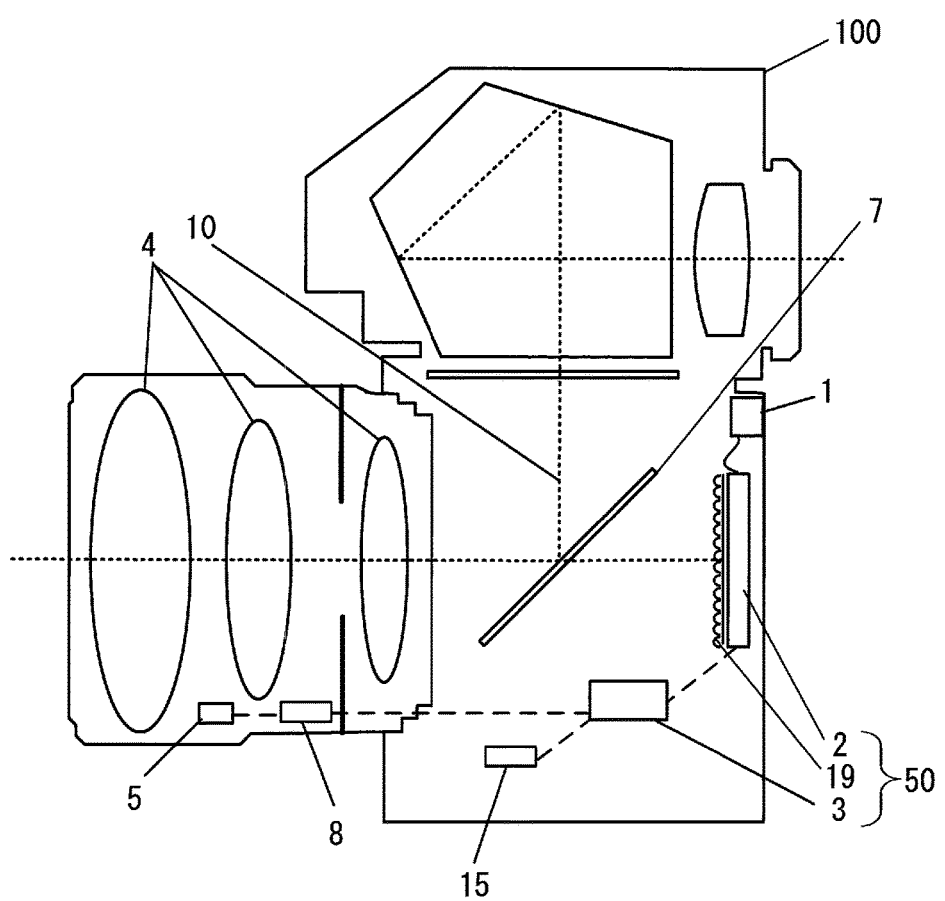
FIG. 21 is a view illustrating a configuration of an image-capturing apparatus having another focus detection device.

(7) The present invention may be applied to not only the focus detection device 50 having the focus detection sensor 6 covered by the microlens array 9 illustrated in FIG. 1, but also a focus detection device 50 having a focus detection sensor 16 receiving light fluxes that have passed through the half mirror 7 and then have been reflected from a sub-mirror 70 to pass through the image reforming optical system 17, or a focus detection device 50 having an image sensor 2 including a focus detection sensor covered by the microlens array 19. FIG. 20 is a view illustrating a configuration of an image-capturing apparatus 100 including a focus detection device 50 having a focus detection sensor 16 having a plurality of focus detection pixels arranged therein, the pixels receiving light fluxes that have transmitted through a half mirror 7 and have been reflected from a sub-mirror 70 and have passed through an image reforming optical system 17. FIG. 21 is a view illustrating a configuration of an image-capturing apparatus 100 including a focus detection device 50 having an image sensor 2 including a focus detection sensor covered by a microlens array 19. In other words, a plurality of focus detection pixels generating a plurality of focus detection signals and a plurality of image-capturing pixels generating a plurality of image-capturing signals are arranged in a mixed manner in the image sensor 2 covered by the microlens array 19. In FIGS. 20 and 21, parts denoted by the same reference numerals as in FIG. 1 are the same as that in the image-capturing apparatus 100 in FIG. 1 and therefore explanation thereof will be omitted.

In the image-capturing apparatus 100 illustrated in FIG. 21, a magnitude of an ISO sensitivity in the image-capturing process performed by the image sensor 2 may be used as a brightness decision index in step S203 in FIG. 6. If the ISO sensitivity is lower than the predetermined value, the controller 3 makes a decision that the brightness of the overall subject image is not lower than the predetermined brightness. In other words, the decision result is No in step S203.

The embodiments and variations described above may be combined. The present invention is not limited to the embodiments and variations described above, and other forms conceivable within the technical idea of the present invention are encompassed in the scope of the present invention, unless impairing features of the present invention.

The disclosure of the following priority application is herein incorporated by reference:
Japanese Patent Application No. 2013-243944 (filed Nov. 26, 2013)

REFERENCE SIGNS LIST

1 . . . liquid crystal display element, 2 . . . image sensor, 3 . . . controller, 4 . . . photographing optical system, 5 . . . lens drive motor, 6 . . . focus detection sensor, 7 . . . half mirror, 8 . . . focus adjustment device, 9 . . . microlens array, 10 . . . optical axis, 15 . . . storage device, 16 . . . focus detection sensor, 17 . . . image reforming optical system, 19 . . . microlens array, 50 . . . focus detection device, 70 . . . sub-mirror

The invention claimed is:

1. A focus detection device comprising:
an output sensor that includes:
at least one first pixel, corresponding to a respective microlens, which detects light having passed through a first pupil region of an optical system and outputs a signal, and
at least one second pixel, corresponding to a respective microlens, which detects light having passed through a second pupil region of the optical system different from the first pupil region and outputs a signal; and
a controller that
obtains a first signal sequence including signals output by the output sensor based upon the light having passed through the first pupil region and a second signal sequence including signals output by the output sensor based upon the light having passed through the second pupil region,
detects a relative shift amount between the first signal sequence and the second signal sequence,
divides each of the first signal sequence and the second signal sequence into a plurality of sections based upon the relative shift amount,
calculates a plurality of relative difference amounts in the plurality of sections respectively, between the first signal sequence and the second signal sequence, based upon the first signal sequence and the second signal sequence, and
calculates a plurality of defocus amounts based upon the plurality of relative difference amounts having been calculated.

2. The focus detection device according to claim 1, wherein
the controller divides each of the first signal sequence and the second signal sequence into a section in which a difference between a signal included in the first signal sequence and a corresponding signal thereto included in the second signal sequence is equal to or higher than a predetermined value and a section in which the difference is smaller than the predetermined value.

3. The focus detection device according to claim 1, wherein
the controller divides each of the first signal sequence and the second signal sequence into three sections.

4. The focus detection device according to claim 1, wherein
the controller calculates a drive amount of the optical system based upon a defocus amount corresponding to a nearest subject to the optical system among the plurality of defocus amounts.

5. A camera comprising the focus detection device according to claim 1.

* * * * *